(12) United States Patent  
Hayashi

(10) Patent No.: US 8,250,661 B2  
(45) Date of Patent: Aug. 21, 2012

(54) IMAGE PROCESSING APPARATUS, INFORMATION PROCESSING APPARATUS, AND METHODS THEREOF

(75) Inventor: Junichi Hayashi, Kamakuri (JP)

(73) Assignee: Canon Kabushiki Kaisha, Tokyo (JP)

( * ) Notice: Subject to any disclaimer, the term of this patent is extended or adjusted under 35 U.S.C. 154(b) by 1363 days.

(21) Appl. No.: 11/615,128

(22) Filed: Dec. 22, 2006

(65) Prior Publication Data

US 2007/0150962 A1 Jun. 28, 2007

(30) Foreign Application Priority Data

Dec. 28, 2005 (JP) ................................. 2005-380172  
Dec. 19, 2006 (JP) ................................. 2006-341948

(51) Int. Cl.
  *G06F 21/00* (2006.01)
  *G06F 12/14* (2006.01)
  *G06Q 20/00* (2012.01)
  *G06F 7/04* (2006.01)

(52) U.S. Cl. ............. 726/26; 705/18; 705/57; 713/182; 713/187; 713/188; 713/189

(58) Field of Classification Search ......................... None
  See application file for complete search history.

(56) References Cited

U.S. PATENT DOCUMENTS

| | | | |
|---|---|---|---|
| 6,535,616 B1 | 3/2003 | Hayashi et al. | |
| 6,741,758 B2 | 5/2004 | Hayashi et al. | |
| 6,826,290 B1 | 11/2004 | Murakami et al. | |
| 6,873,711 B1 | 3/2005 | Murakami et al. | |
| 6,993,148 B1 | 1/2006 | Miyashita et al. | |
| 7,006,257 B1 | 2/2006 | Yamazaki et al. | |
| 7,006,660 B2 | 2/2006 | Hayashi | |
| 7,142,689 B2 | 11/2006 | Hayashi et al. | |
| 7,146,502 B2 | 12/2006 | Hayashi | |
| 7,167,988 B2 | 1/2007 | Hayashi | |
| 7,187,781 B2 | 3/2007 | Hayashi | |
| 2003/0023564 A1* | 1/2003 | Padhye et al. ................... 705/54 |
| 2003/0202680 A1 | 10/2003 | Hayashi | |
| 2003/0204812 A1 | 10/2003 | Hayashi | |
| 2004/0003269 A1* | 1/2004 | Waxman et al. .............. 713/193 |
| 2004/0081334 A1 | 4/2004 | Hayashi | |
| 2004/0177251 A1 | 9/2004 | Hayashi | |

(Continued)

FOREIGN PATENT DOCUMENTS

JP  2001-325387 A  11/2001

(Continued)

*Primary Examiner* — Philip Chea  
*Assistant Examiner* — Fatoumata Traore  
(74) *Attorney, Agent, or Firm* — Fitzpatrick, Cella, Harper & Scinto

(57) ABSTRACT

Upon applying a DRM protection process to an image which is generated by an image processing apparatus, which doesn't have any communication means that allows direct communications with a PC, without any alteration, encryption of the image in the apparatus and that of the image in the PC as an internal process of the DRM are required, resulting in poor efficiency. The apparatus executes a part of the DRM protection process for the image, and outputs the encrypted image. The PC receives the image which has undergone the part of the DRM protection process, executes the remaining part of the DRM protection process, and outputs the image which has undergone the DRM protection process. In this case, the PC transmits use condition of the input image to a license server, receives signed use condition from the server, and combines the signed use condition with the input encrypted image.

4 Claims, 24 Drawing Sheets

U.S. PATENT DOCUMENTS

| | | |
|---|---|---|
| 2005/0209972 A1* | 9/2005 | Bjorkengren et al. .......... 705/57 |
| 2006/0020809 A1 | 1/2006 | Hayashi |
| 2006/0033942 A1 | 2/2006 | Yamazaki et al. |
| 2006/0149762 A1 | 7/2006 | Suga et al. |
| 2006/0294385 A1 | 12/2006 | Hayashi |
| 2007/0127771 A1 | 6/2007 | Kaneda et al. |

FOREIGN PATENT DOCUMENTS

| | | |
|---|---|---|
| JP | 2004-038974 | 2/2004 |
| JP | 2004-038974 A | 2/2004 |
| JP | 2004-110277 A | 4/2004 |
| JP | 2005-123979 A | 5/2005 |

* cited by examiner

FIG. 7

| DRM-PROTECTED IMAGE DATA |
|---|
| SIGNED USE CONDITION DATA |
| ENCRYPTED EXCHANGE KEY |
| ENCRYPTED IMAGE KEY |
| ENCRYPTED IMAGE DATA |

FIG. 21

| DRM-PROTECTED IMAGE DATA |
|---|
| SIGNED USE CONDITION DATA (INCLUDING ENCRYPTED IMAGE KEY) |
| ENCRYPTED IMAGE DATA |

FIG. 24

| (ENCRYPTED USE CONDITION DATA) |
| --- |
| ENCRYPTED EXCHANGE KEY |
| ENCRYPTED IMAGE KEY |
| CONTROL INFORMATION |
| ENCRYPTED IMAGE DATA |

IMAGE PROCESSING APPARATUS, INFORMATION PROCESSING APPARATUS, AND METHODS THEREOF

BACKGROUND OF THE INVENTION

1. Field of the Invention

The present invention relates to an image processing apparatus, information processing apparatus, and methods thereof and, more particularly, to an image processing apparatus and information processing apparatus, which are used to protect the rights of image data, and their methods.

2. Description of the Related Art

A technique called Digital Rights Management (DRM) that aims at implementing protection of image data rights and the like is known. The DRM uses the following technique. That is, the DRM sets the use condition of image data upon preparation of the image data. Upon using that image data, the DRM controls use of that image data by checking whether the set use condition is met.

A DRM protection process will be described below. The DRM protection process sets a use condition corresponding to image data to be protected, and generates an encryption key unique to each individual image to encrypt the image data. In the following description, the encryption key to be generated for each image will be referred to as an "image key". Especially, by transmitting the use condition to a license server, the license server appends its signature on the use condition. The encrypted image data and signed use condition are combined, and the combined data is output as DRM-protected image data.

Upon applying the DRM to image data, a digital camera, image scanner, digital multi-functional peripheral (MFP), or the like (to be referred to as an image processing apparatus hereinafter) has no communication means with the license server. Or the image processing apparatus does not directly communicate with the license server in consideration of communication cost. In such a case, the image processing apparatus must transmit generated image data to a personal computer or the like (to be referred to as a PC hereinafter), and the PC must execute the DRM protection process. In this case, in consideration of the security of image data, the image processing apparatus must encrypt the generated image data, and must transmit it to the PC. The PC must decrypt the encrypted image data, and then apply the DRM protection process to that image data. Encryption in this image processing apparatus is to prevent wiretap or alteration of image data during transmission from the image processing apparatus to the PC.

On the other hand, the normal DRM protection process executes encryption as its internal process. Encryption in the DRM protection process is to protect the rights of image data. Therefore, upon applying the DRM protection process to image data which is generated by the image processing apparatus that does not have any communication means for directly communicating with an information processing apparatus such as a license server or the like without any alteration, encryption of image data is required twice. That is, encryption in the image processing apparatus and then in the PC as the internal process of the DRM are required, resulting in poor efficiency.

SUMMARY OF THE INVENTION

The first aspect of the present invention discloses a system for protecting image data having an image processing apparatus and an information processing apparatus, wherein the image processing apparatus comprises: a generator, arranged to generate image data; a first processor, arranged to execute a part of a DRM protection process for the image data, wherein the first processor comprises an encryption section arranged to encrypt the image data generated by the generator; and a first output section, arranged to output the image data which has undergone the part of the DRM protection process, and wherein the information processing apparatus comprises: an input section, arranged to input the image data which has undergone the part of the DRM protection process; a second processor, arranged to execute a remaining part of the DRM protection process for the image data, wherein the second processor comprises a communication section arranged to transmit use condition data of the image data input by the input section to a license server, and to receive signed use condition data from the license server, and a combiner, arranged to combine the signed use condition data and the encrypted image data input by the input section; and a second output section, arranged to output the image data which has undergone all the parts of the DRM protection process.

The second aspect of the present invention discloses an information processing apparatus comprising: an input section, arranged to input image data which has undergone a part of the DRM protection process, and control information used to specify the part of the DRM protection process, wherein the image data has been encrypted; a processor, arranged to execute a remaining part of the DRM protection process in accordance with the control information, wherein the processor comprises a controller arranged to control the remaining part of the DRM protection process in accordance with the control information, a communication section arranged to transmit use condition data of the image data input by the input section to a license server, and to receive signed use condition data from the license server, and a combiner, arranged to combine the signed use condition data and the encrypted image data input by the input section; and an output section, arranged to output the image data which has undergone all the parts of the DRM protection process.

The third aspect of the present invention discloses an information processing method comprising the steps of: inputting image data which has undergone a part of the DRM protection process, and control information used to specify the part of the DRM protection process, wherein the image data has been encrypted; executing a remaining part of the DRM protection process in accordance with the control information, wherein the execution step comprises the control step of controlling the remaining part of the DRM protection process in accordance with the control information, the communication step of transmitting use condition data of the image data input in the input step to a license server, and to receive signed use condition data from the license server, and the combination step of combining the signed use condition data and the encrypted image data input in the input step; and outputting the image data which has undergone all the parts of the DRM protection process.

According to the present invention, image data which is generated by an apparatus that has no communication means with an information processing apparatus can efficiently and securely undergo a DRM protection process.

Further features of the present invention will become apparent from the following description of exemplary embodiments with reference to the attached drawings.

BRIEF DESCRIPTION OF THE DRAWINGS

FIG. 7 shows the structure of DRM-protected image data;

FIG. 21 shows the structure of DRM-protected image data according to the third modification;

FIG. 24 shows the configuration of encrypted image data and the like to be output from the image processing apparatus.

DESCRIPTION OF THE EMBODIMENTS

An image processing apparatus, information processing apparatus, and processes to be executed by these apparatuses according to preferred embodiments of the present invention will be described in detail hereinafter with reference to the accompanying drawings.

First Embodiment

[System Arrangement]

Figure 1:
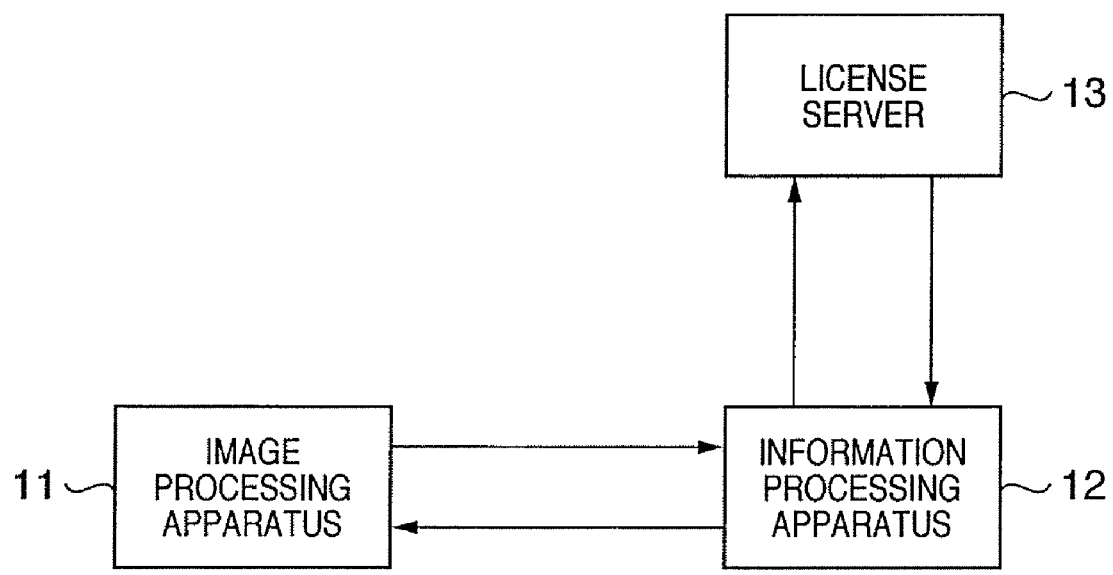
FIG. 1 is a diagram showing the arrangement of a system according to the first embodiment.

FIG. 1 shows the arrangement of a system according to the first embodiment.

An image processing apparatus 11 includes a digital camera, image scanner, MFP, or the like (to be referred to as an image processing apparatus hereinafter). An information processing apparatus 12 is a client which executes the DRM protection process together with the image processing apparatus 11 so as to protect the rights of image data generated by the image processing apparatus 11. A license server 13 is a server which issues an issued license to the image data generated by the image processing apparatus 11. The information processing apparatus 12 and the license server 13 may comprise a general-purpose computer such as a personal computer or the like (to be referred to as a PC hereinafter).

The image processing apparatus 11 generates image data, and applies a first process as a part of the DRM protection process to the image data. The image processing apparatus 11 outputs the image data that has undergone the first process and related data to the information processing apparatus 12. Communication between the image processing apparatus 11 and information processing apparatus 12 may use a serial bus such as USB (Universal Serial Bus), IEEE1394, or the like, a wired network, or a wireless network such as IEEE802.11a/b/g or the like. Of course, the user may take image data from the image processing apparatus 11 to the information processing apparatus 12 using a portable storage medium such as a memory card or the like.

The information processing apparatus 12 applies a second process as the remaining DRM protection process, which is not included in the first process, to the image data input from the image processing apparatus 11. In order to execute the second process, the information processing apparatus 12 requests the license server 13 to acquire an issued license.

[Image Processing Apparatus]

Figure 2:
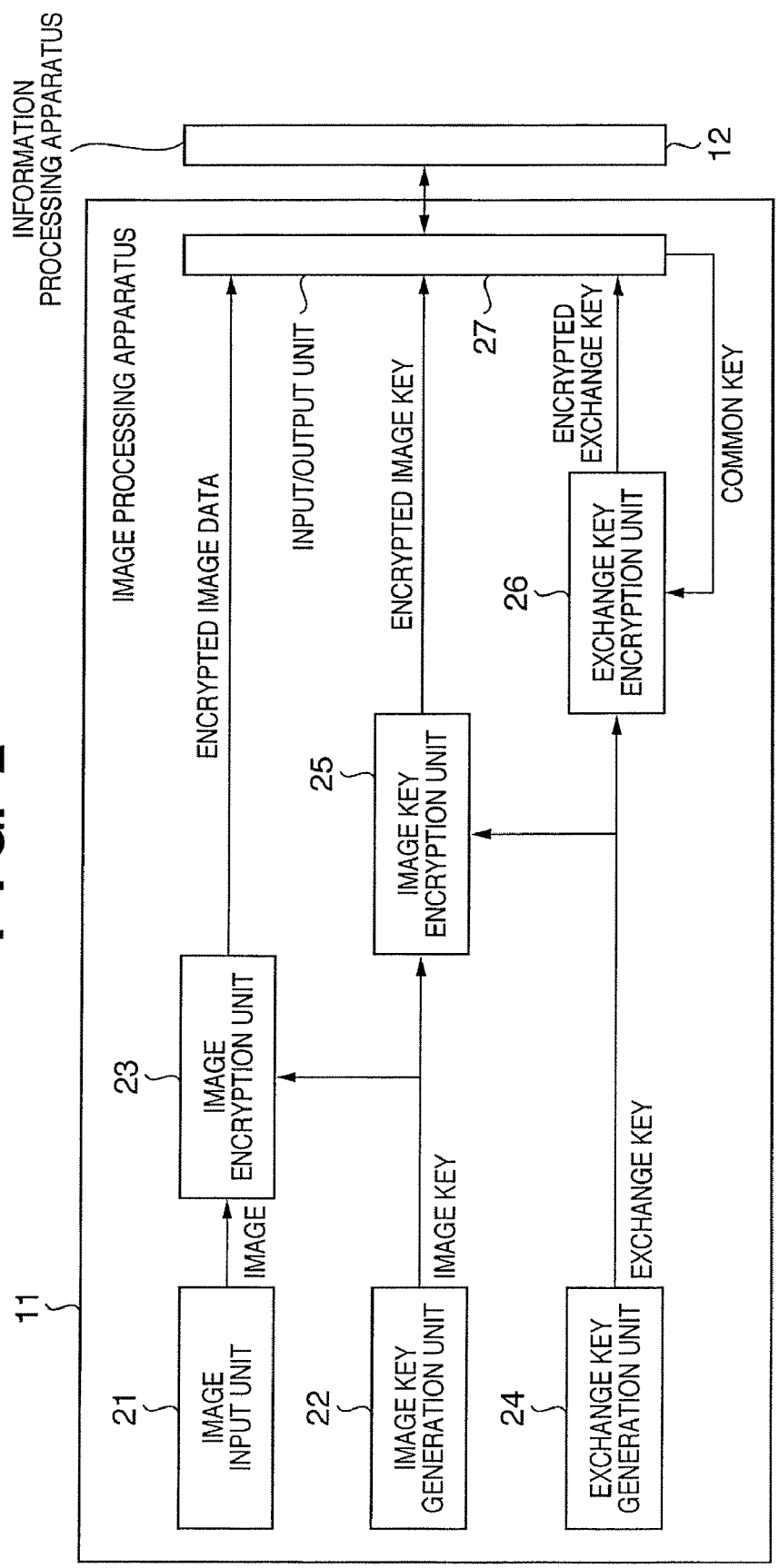
FIG. 2 is a block diagram for explaining the arrangement of an image processing apparatus.

FIG. 2 is a block diagram showing the arrangement of the image processing apparatus 11. Note that respective processors will be described as hardware components in the following description for the sake of convenience, but functions corresponding to the respective processors may be implemented by computer programs. Especially, assume that the image processing apparatus 11 (FIG. 2) of the first embodiment is an apparatus which has neither communication means that can directly communicate with the license server 13, nor an input interface that inputs the use condition of image data.

An image input unit 21 inputs image data by scanning, image sensing, or the like. For example, when the image processing apparatus 11 is an MFP, the image input unit 21 has an auto document feeder (ADF), and feeds a document by the ADF. The image input unit 21 irradiates the document with light, images light reflected by the document on a solid-state image sensing element via a lens, and generates image data based on a video signal output from the solid-state image sensing element. On the other hand, when the image processing apparatus 11 is a digital camera, the image input unit 21 has an optical sensor such as a CCD (charge coupled device) or the like, a microprocessor for controlling an optical system, and the like, and generates image data based on a video signal generated by the optical system and optical sensor.

An image key generation unit 22 generates an image key used to encrypt image data generated by the image input unit 21. An exchange key generation unit 24 generates an encryption key used to encrypt the image key generated by the image key generation unit 22. Note that the encryption key used to encrypt the image key will be referred to as an "exchange key" hereinafter since it is exchanged among the image processing apparatus 11, information processing apparatus 12, and license server 13.

An image encryption unit 23 encrypts the image data generated by the image input unit 21 using the image key generated by the image key generation unit 22. An image key encryption unit 25 encrypts the image key generated by the image key generation unit 22 using the exchange key generated by the exchange key generation unit 24. An exchange key encryption unit 26 encrypts the exchange key generated by the exchange key generation unit 24 using a common key. Assume that the common key used by the exchange key encryption unit 26 is securely shared between the image processing apparatus 11 and information processing apparatus 12 in advance.

An input/output unit 27 is an interface that exchanges data with the information processing apparatus 12 and license server 13. The input/output unit 27 outputs the encrypted image data, encrypted image key, and encrypted exchange key to the information processing apparatus 12.

Image Key

The image key generation unit 22 generates different image key data for each image data every time the image input unit 21 generates image data. In the first embodiment, the image key generation unit 22 executes the following process.

$$K_{IMG}=H(I|\text{'IMG'}) \qquad (1)$$

where $K_{IMG}$ is the image key data,

H(·) is a one-way function,

I is the image data generated by the image input unit 21,

'IMG' is an ASCII code corresponding to a character string "IMG", and x|y is a combination process between data x and data y.

Note that equation (1) describes an example that combines the image data I and ASCII code 'IMG'. However, the present invention is not limited to such a specific example, and an arbitrary ASCII code may be applied. The one-way function is a function which can easily calculate y=H(x) to have x as input data, but can hardly calculate x from y. As the one-way function, a Hash function such as MD5, SHA-1, SHA-256, RIPE-MD, or the like can be applied.

The above example explained the method of generating a different image key for each image data using the one-way function. However, as a method of generating a different image key for each image data, for example, a pseudo random number generator may be used to generate a different pseudo random number for each image data, and may output the generated pseudo random number as an image key.

Exchange Key

The exchange key generation unit 24 outputs data unique to the image processing apparatus 11, which is securely held in a nonvolatile memory in the image processing apparatus 11, as an exchange key. The exchange key generation unit 24 may generate a different exchange key for each image data every time the image input unit 21 generates image data, like in the generation process of the image key. In this case, the exchange key generation unit 24 executes the following process.

$$K_{EX}=H(I|\text{'EX'}) \qquad (2)$$

where $K_{EX}$ is the exchange key data,

H(·) is a one-way function,

I is the image data generated by the image input unit 21,

'EX' is an ASCII code corresponding to a character string "EX", and x|y is a combination process between data x and data y.

Note that equation (2) describes an example that combines the image data I and ASCII code 'EX'. However, the present invention is not limited to such a specific example, and an arbitrary ASCII code may be applied.

The above example has explained the method of generating a different exchange key for each image data using the one-way function. However, as a method of generating a different exchange key for each image data, for example, a pseudo random number generator may be used to generate a different pseudo random number for each image data, and may output the generated pseudo random number as an exchange key. Alternatively, a pseudo random number may replace image data in equation (1) or (2) to generate an image key or exchange key.

Encryption of Image

The image encryption unit 23 executes the following process.

$$EI=Ec(K_{IMG},I) \qquad (3)$$

where EI is the encrypted image data,

Ec(x, y) is the encryption process for encrypting plain text y using key data x, $K_{IMG}$ is the image key data, and I is the image data.

Note that the encryption process in the first embodiment is not particularly limited, and various common key-based encryption algorithms including a block encryption algorithm such as AES, DES, or the like, a stream encryption algorithm such as RC4 or the like, and so forth can be applied.

Encryption of Image Key

The image key encryption unit 25 executes the following process.

$$EK_{IMG}=Ec(K_{EX},K_{IMG}) \qquad (4)$$

where $EK_{IMG}$ is the encrypted image key data,

Ec(x, y) is the encryption process for encrypting plain text y using key data x, $K_{EX}$ is the exchange key data, and $K_{IMG}$ is the image key data.

Encryption of Exchange Key

The exchange key encryption unit 26 executes the following process.

$$EK_{EX}=Ec(K_C,K_{EX}) \qquad (5)$$

where $EK_{EX}$ is the encrypted exchange key data,

Ec(x, y) is the encryption process for encrypting plain text y using key data x, $K_C$ is the common key data, and $K_{EX}$ is the exchange key data.

Note that the encryption process in the first embodiment is not limited to equation (5), and various common key-based encryption algorithms including a block encryption algorithm such as AES, DES, or the like, a stream encryption algorithm such as RC4 or the like, and so forth can be applied.

First Process

Figure 3:
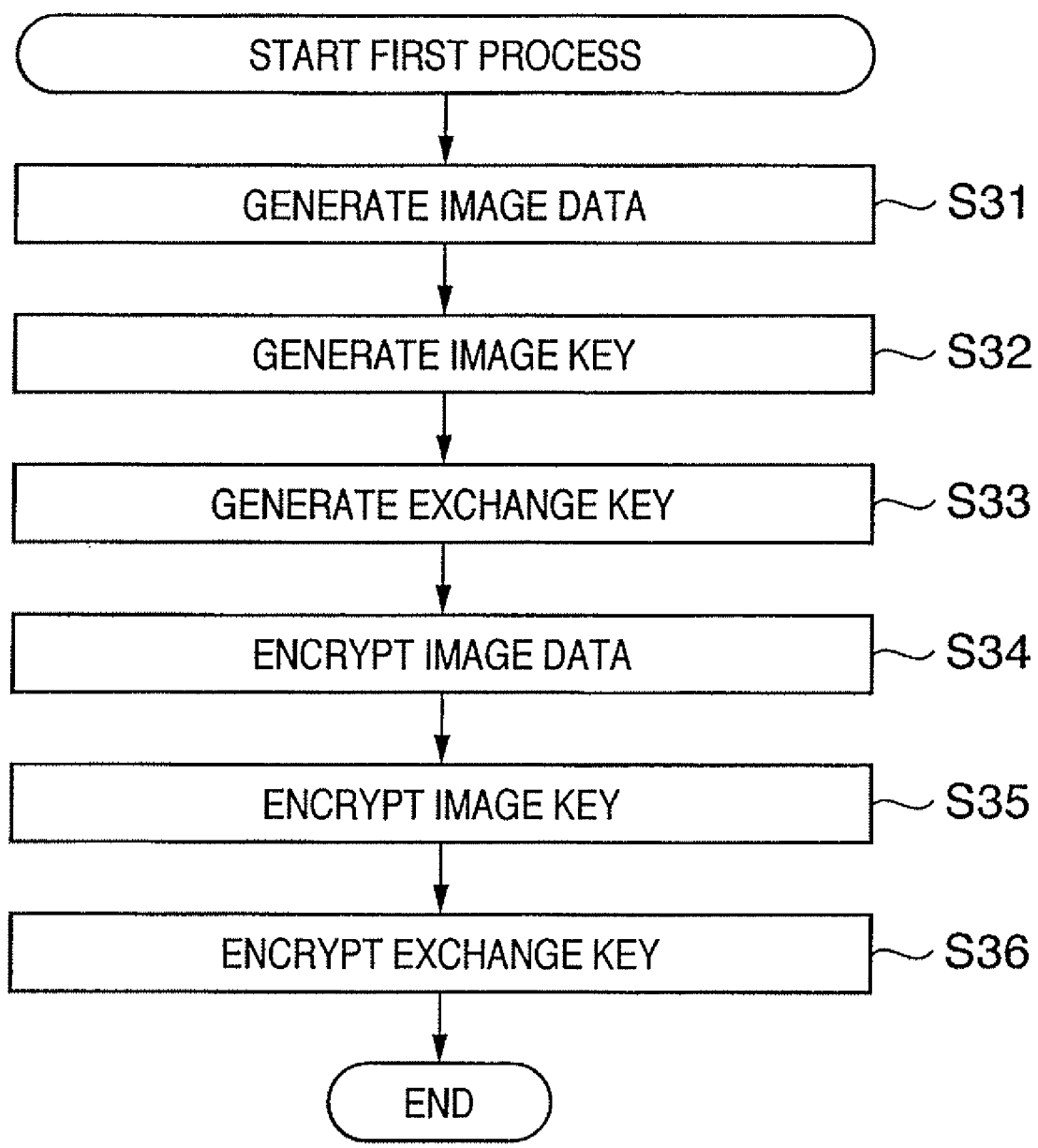
FIG. 3 is a flowchart showing the procedure of a first process to be executed by the image processing apparatus.

FIG. 3 is a flowchart showing the procedure of the first process to be executed by the image processing apparatus 11.

The image input unit 21 generates image data (S31). The image key generation unit 22 and exchange key generation unit 24 respectively generate an image key and exchange key (S32, S33).

The image encryption unit 23 encrypts the image data using the image key (S34). The image key encryption unit 25 encrypts the image key using the exchange key (S35).

The exchange key encryption unit 26 encrypts the exchange key using a common key (S36).

[Information Processing Apparatus]

Figure 4:
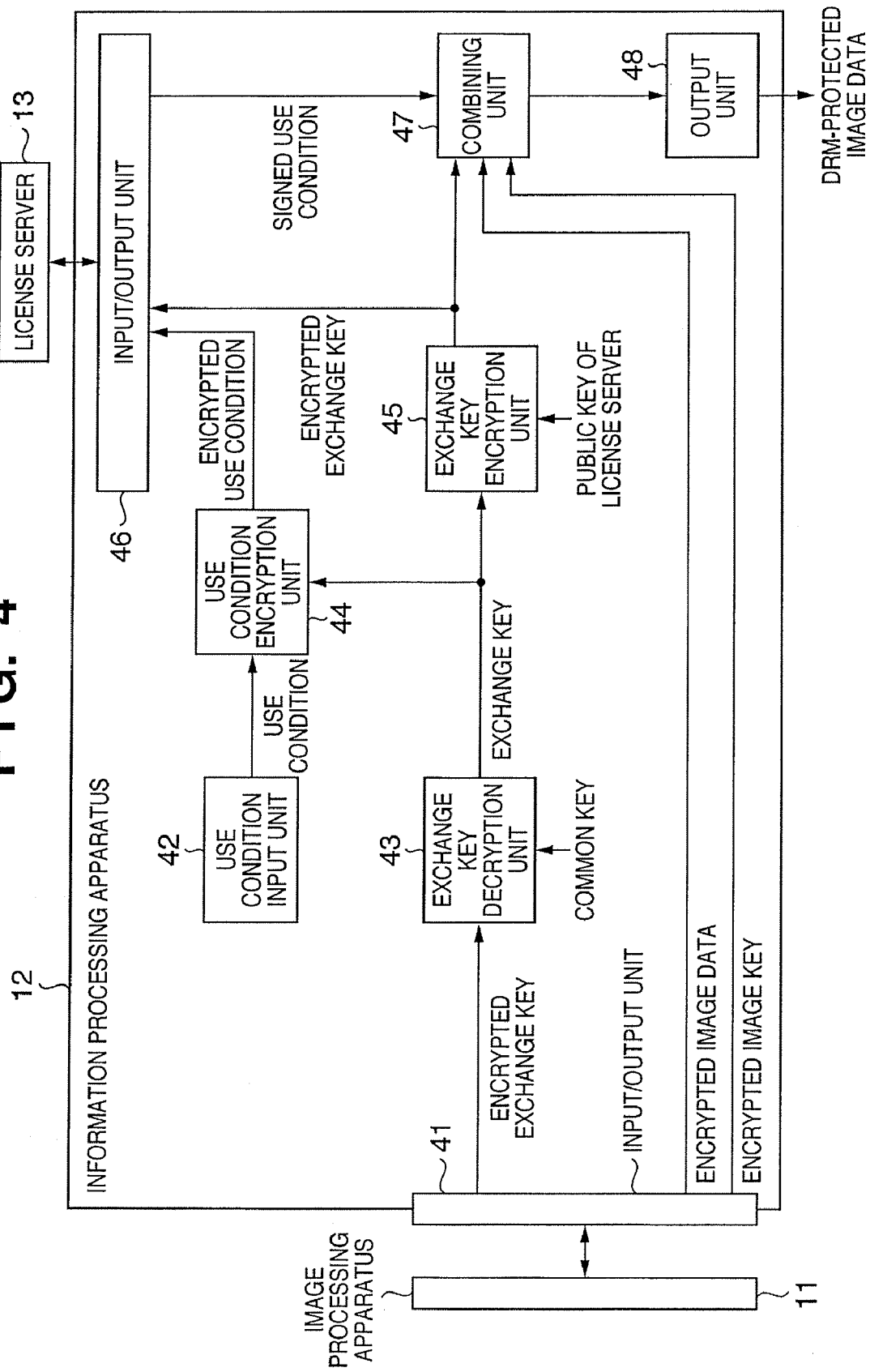
FIG. 4 is a block diagram showing the arrangement of an information processing apparatus.

FIG. 4 is a block diagram showing the arrangement of the information processing apparatus 12. Note that respective processors will be described as hardware components in the following description for the sake of convenience, but functions corresponding to the respective processors may be implemented by computer programs.

An input/output unit 41 receives the encrypted image data, encrypted image key, and encrypted exchange key from the image processing apparatus 11. An input/output unit 46 outputs encrypted use condition data (to be described later) and the encrypted exchange key to the license server 13, and receives signed use condition data from the license server 13. Note that the two input/output units 41 and 46 have been separately explained, but they may be combined into one input/output unit.

Use Condition

Figure 5:
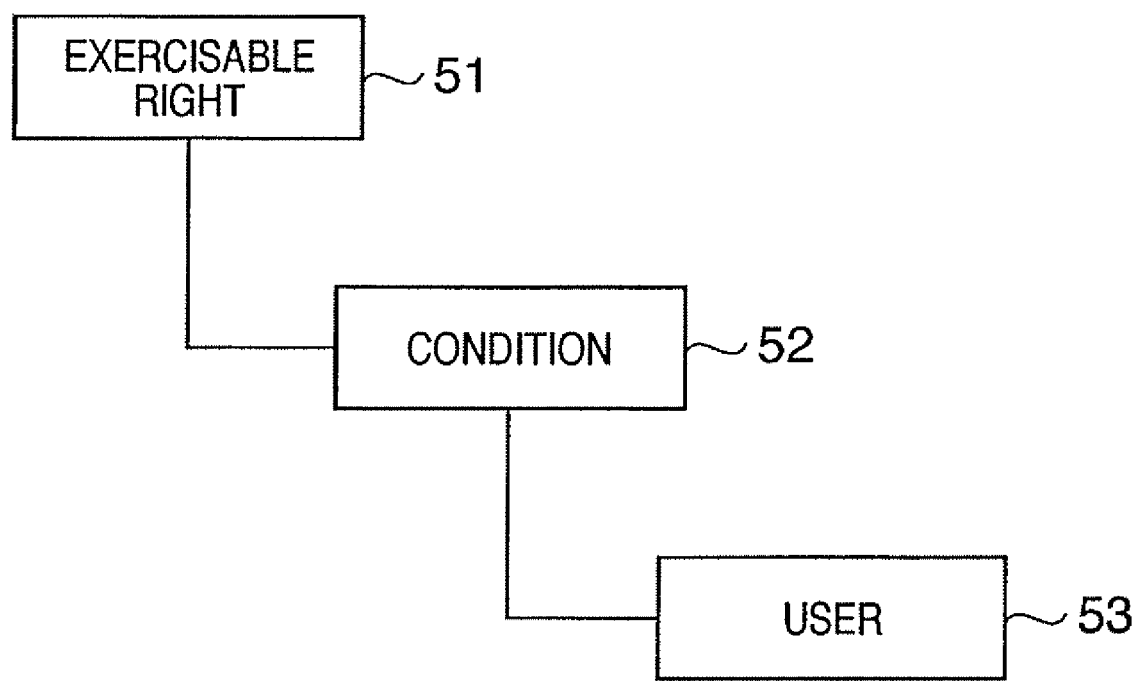
FIG. 5 is a view for explaining a use condition.

A use condition input in the information processing apparatus 12 will be described below. FIG. 5 is a view for explaining the use condition, which describes an exercisable right 51 to image data, a condition 52 required to exercise the right 51, and a user 53 who can exercise the right 51 under the condition 52 as one unit. Of course, a plurality of unitary use conditions may be described to set complicated use conditions. The use condition may be described using either a language such as XML (extensible markup language) or the like or binary data.

Figure 6:
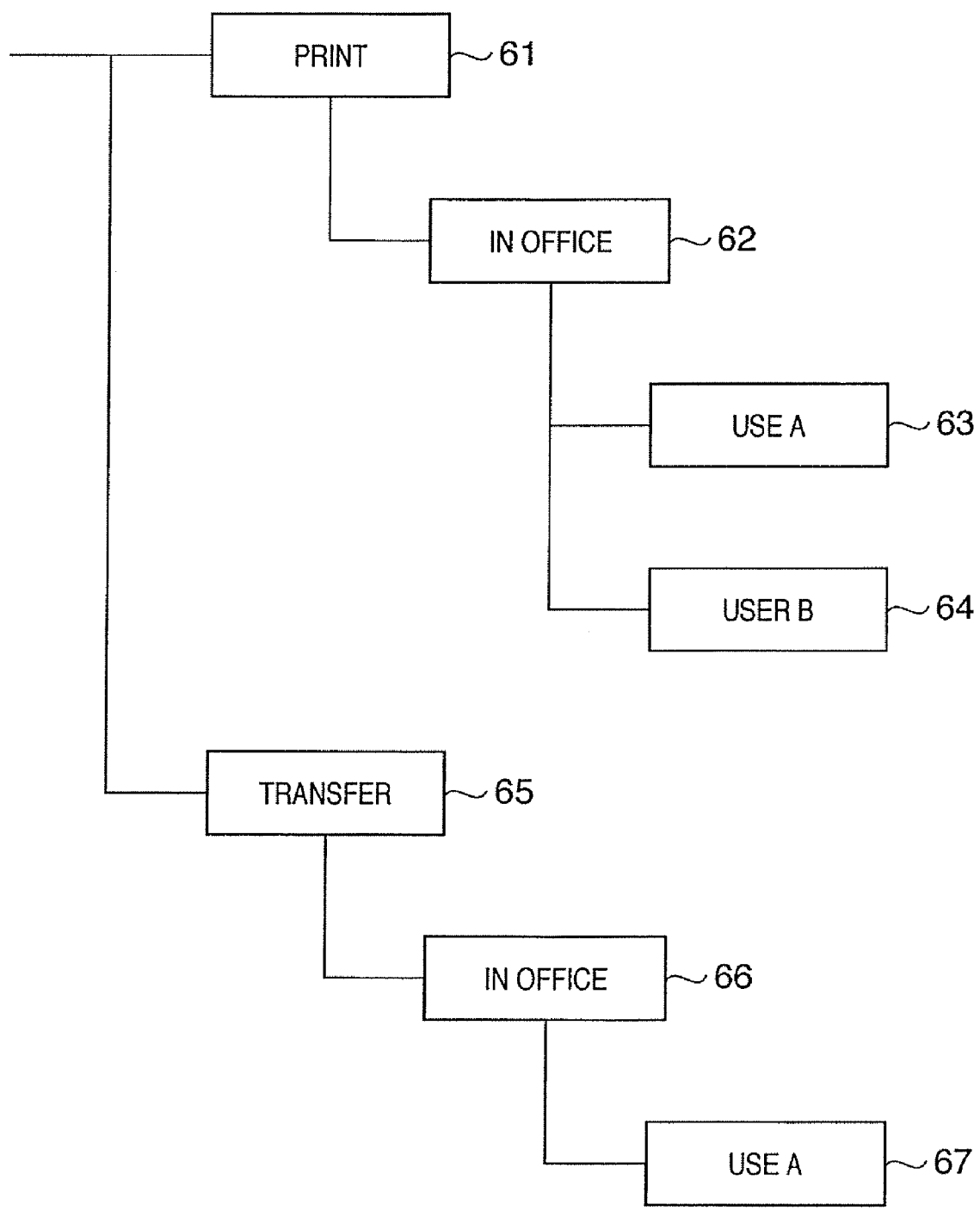
FIG. 6 shows an example of the use condition.

FIG. 6 shows an example of the use condition. The use condition shown in FIG. 6 represents that "user A" 63 and "user B" 64 can exercise image data "print" 61 under a condition "in office" 62, and "user A" 67 can exercise image data "transfer" 65 under a condition "in office" 66.

Of course, the description method of the use condition is not limited to FIGS. 5 and 6, and various other description methods may be used. The use condition is not always set for each image data. For example, some use conditions are held in the image processing apparatus 11 or license server 13 in advance. A use condition input unit 42 allows the user to select a desired condition from a list of use conditions held in the image processing apparatus 11 or license server 13. In this way, the trouble of having to input the use condition for each image data to be generated can be avoided, thus improving user's convenience.

Alternatively, only a use condition which is set in advance may be applied in place of input of the desired use condition by the user. For example, if the use condition according to the handling policy of confidential documents in a corporation is set in advance, information leak of scanned image data can be prevented more securely.

The use condition input unit 42 inputs the use condition of the image data received by the input/output unit 41 using an input interface (not shown).

An exchange key decryption unit 43 decrypts the encrypted exchange key received by the input/output unit 41 using the common key.

A use condition encryption unit 44 encrypts the use condition data output from the use condition input unit 42 using the exchange key decrypted by the exchange key decryption unit 43. An exchange key encryption unit 45 encrypts the exchange key decrypted by the exchange key decryption unit 43 using a public key of the license server 13.

Decryption of Exchange Key

The exchange key decryption unit 43 executes the following process.

$$K_{EX}=Dc(K_c, EK_{EX}) \quad (6)$$

where $K_{EX}$ is the decrypted exchange key data,
$Dc(x, y)$ is the decryption process for decrypting cipher text y using key data x,
$K_c$ is the common key data, and
$EK_{EX}$ is the encrypted exchange key data.

The decryption process Dc executed by the exchange key decryption unit 43 corresponds to the encryption process Ec executed by the exchange key encryption unit 26 shown in FIG. 2.

A combining unit 47 receives the encrypted image data, encrypted image key, and encrypted exchange key, which are input by the input/output unit 41, and the signed use condition data which is input by the input/output unit 46. The combining unit 47 combines these data. An output unit 48 outputs the data combined by the combining unit 47 as DRM-protected image data.

FIG. 7 shows the structure of the DRM-protected image data, which has a structure obtained by combining the four data input to the combining unit 47. Note that the first embodiment is not limited to the data structure shown in FIG. 7, and some or all of the four data may be separated. Especially, when all the four data are separately output, the combining unit 47 does not execute any special process.

Second Process

Figure 8:
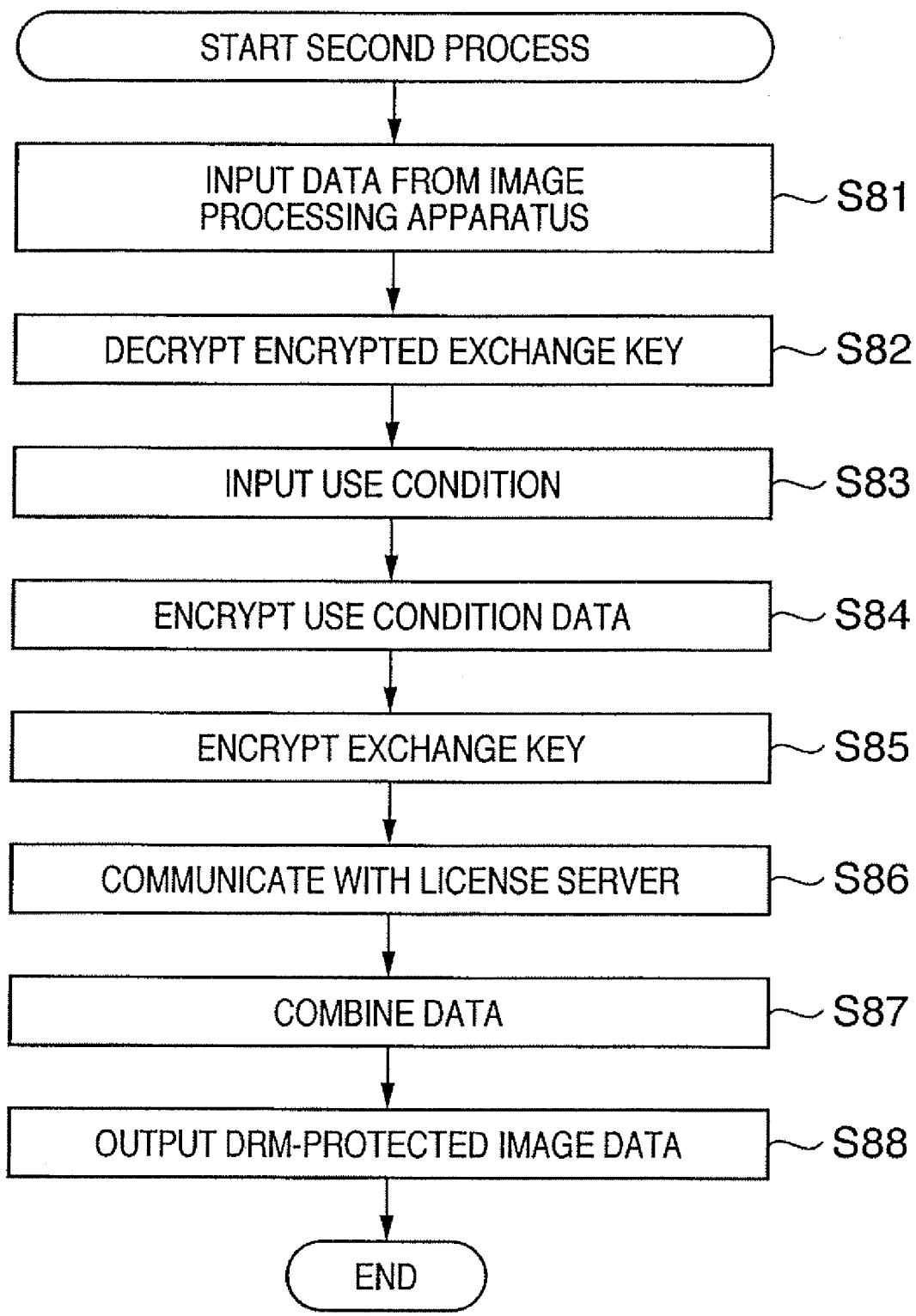
FIG. 8 is a flowchart showing the procedure of a second process to be executed by the information processing apparatus.

FIG. 8 is a flowchart showing the procedure of the second process to be executed by the information processing apparatus 12.

The input/output unit 41 receives the encrypted image data, encrypted image key, and encrypted exchange key from the image processing apparatus 11 (S81). The exchange key decryption unit 43 decrypts the encrypted exchange key (S82). On the other hand, the use condition input unit 42 inputs the use condition of the image data received by the input/output unit 41 (S83), and the use condition encryption unit 44 encrypts data of the use condition (S84). After that, the exchange key encryption unit 45 encrypts the exchange key (S85). Then, the input/output unit 46 communicates with the license sever 13 to output the encrypted use condition data and encrypted exchange key to the license server 13, and receives the signed use condition data from the license server 13 (S86).

The combining unit 47 combines, with the signed use condition data input in step S86, the encrypted image data and encrypted image key input in step S81, and the encrypted exchange key encrypted in step S85 (S87). The output unit 48 outputs the data combined by the combining unit 47 as DRM-protected image data (S88).

[License Server]

Figure 9:
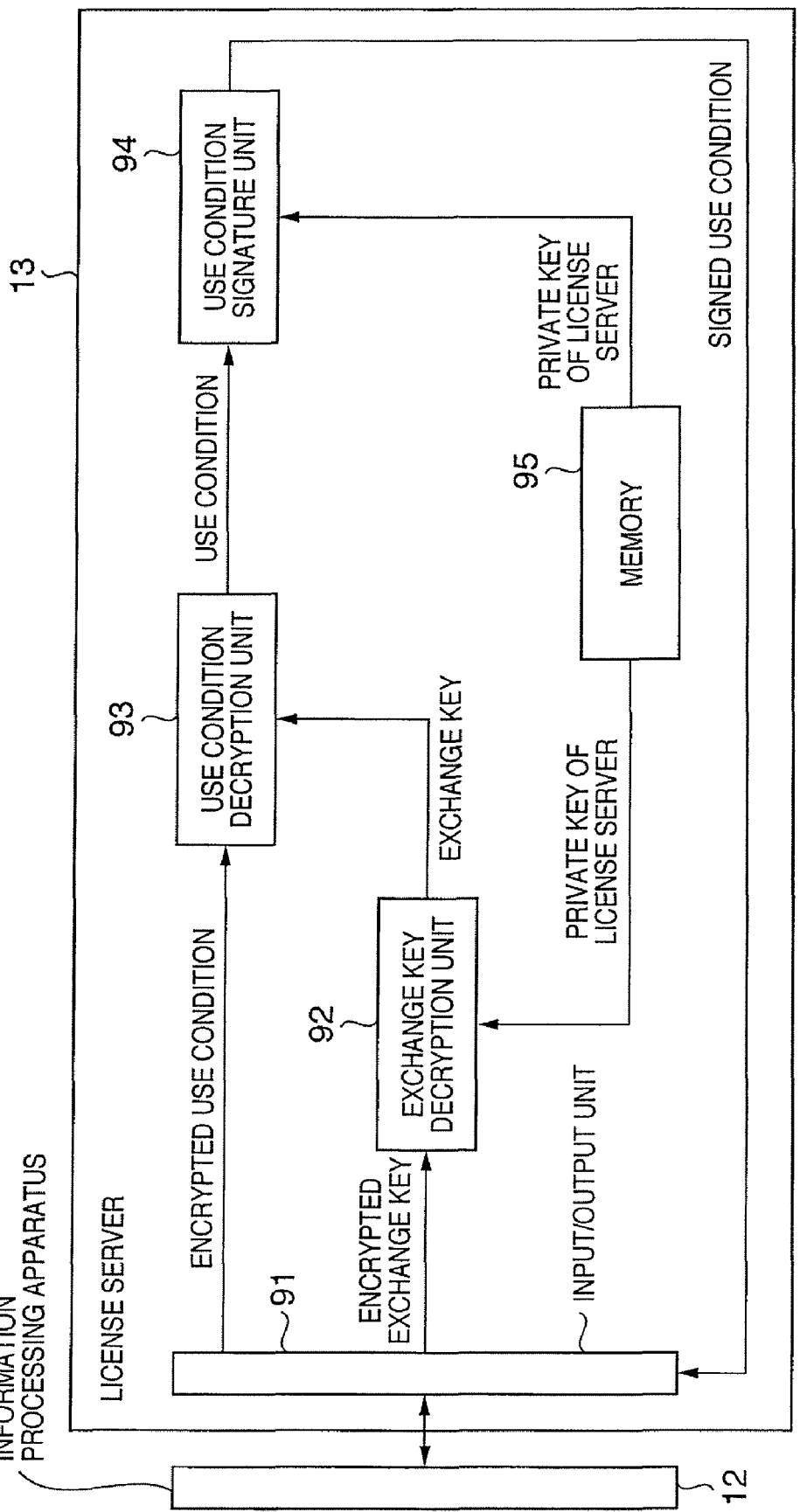
FIG. 9 is a block diagram showing the arrangement of a license server.

FIG. 9 is a block diagram showing the arrangement of the license server 13. Note that respective processors will be described as hardware components in the following description for the sake of convenience, but functions corresponding to the respective processors may be implemented by computer programs.

An input/output unit 91 receives the encrypted use condition data and encrypted exchange key from the information processing apparatus 12, and outputs the signed use condition data to the information processing apparatus 12. An exchange key decryption unit 92 decrypts the encrypted exchange key received by the input/output unit 91 using a private key of the license server 13, which is securely stored in a memory 95. Note that the memory 95 also stores a public key of the license server 13. Although not shown in FIG. 9, upon receiving a public key request from the image processing apparatus 11 or the like, the license server 13 outputs the public key read out from the memory 95 to the request source via the input/output unit 91.

A use condition decryption unit 93 decrypts the encrypted use condition data received by the input/output unit 91 using the exchange key decrypted by the exchange key decryption unit 92. A use condition signature unit 94 signs the use condition data decrypted by the use condition decryption unit 93 using the private key of the license server 13, and outputs the signed use condition data to the input/output unit 91.

Decryption of Exchange Key

The exchange key decryption unit 92 executes the following process.

$$K_{EX}=Dp(KL_{PRI},EK_{EX}) \quad (7)$$

where $K_{EX}$ is the decrypted exchange key data,

Dp(x, y) is the decryption process for decrypting cipher text y using key data x, $KL_{PRI}$ is the secret key data of the license server, and $EK_{EX}$ is the encrypted exchange key data.

The decryption process Dp executed by the exchange key decryption unit 92 corresponds to the encryption process Ep executed by the aforementioned exchange key encryption unit 45. Likewise, the private key $KL_{PRI}$ used by the exchange key decryption unit 92 corresponds to a public key $KL_{PUB}$ used by the aforementioned exchange key encryption unit 45.

When the public key $KL_{PUB}$ used by the exchange key encryption unit 45 is correct, i.e., when it corresponds to the private key $KL_{PRI}$, the exchange key decryption unit 92 can decrypt data corresponding to the exchange key generated by the exchange key generation unit 24.

Decryption of Use Condition

The use condition decryption unit 93 executes the following process.

$$C=Dc(K_{EX},EC) \quad (8)$$

where C is the decrypted use condition data,

Dc(x, y) is the decryption process for decrypting cipher text y using key data x, $K_{EX}$ is the decrypted exchange key data, and EC is the encrypted use condition data.

The decryption process Dc executed by the use condition decryption unit 93 corresponds to the encryption process Ep executed by the aforementioned use condition encryption unit 44. When the exchange key decryption unit 92 decrypts a correct exchange key, the use condition data decrypted by the use condition decryption unit 93 is data meeting the use condition input (generated) by the use condition input unit 42.

Signature Process

The use condition signature unit 94 executes the following process.

$$SIGN=S(KL_{PRI},C) \quad (9)$$

where SIGN is the signed use condition data,

S(x, y) is the signature process for signing data y to be signed using key data x, $KL_{PRI}$ is the private key data, and C is the decrypted use condition data.

In the first embodiment, the processes of the exchange key decryption unit 92 and use condition signature unit 94 use the same key (private key of the license server 13). However, the present invention is not limited to this, and they may use different keys.

Issued License

Figure 10:
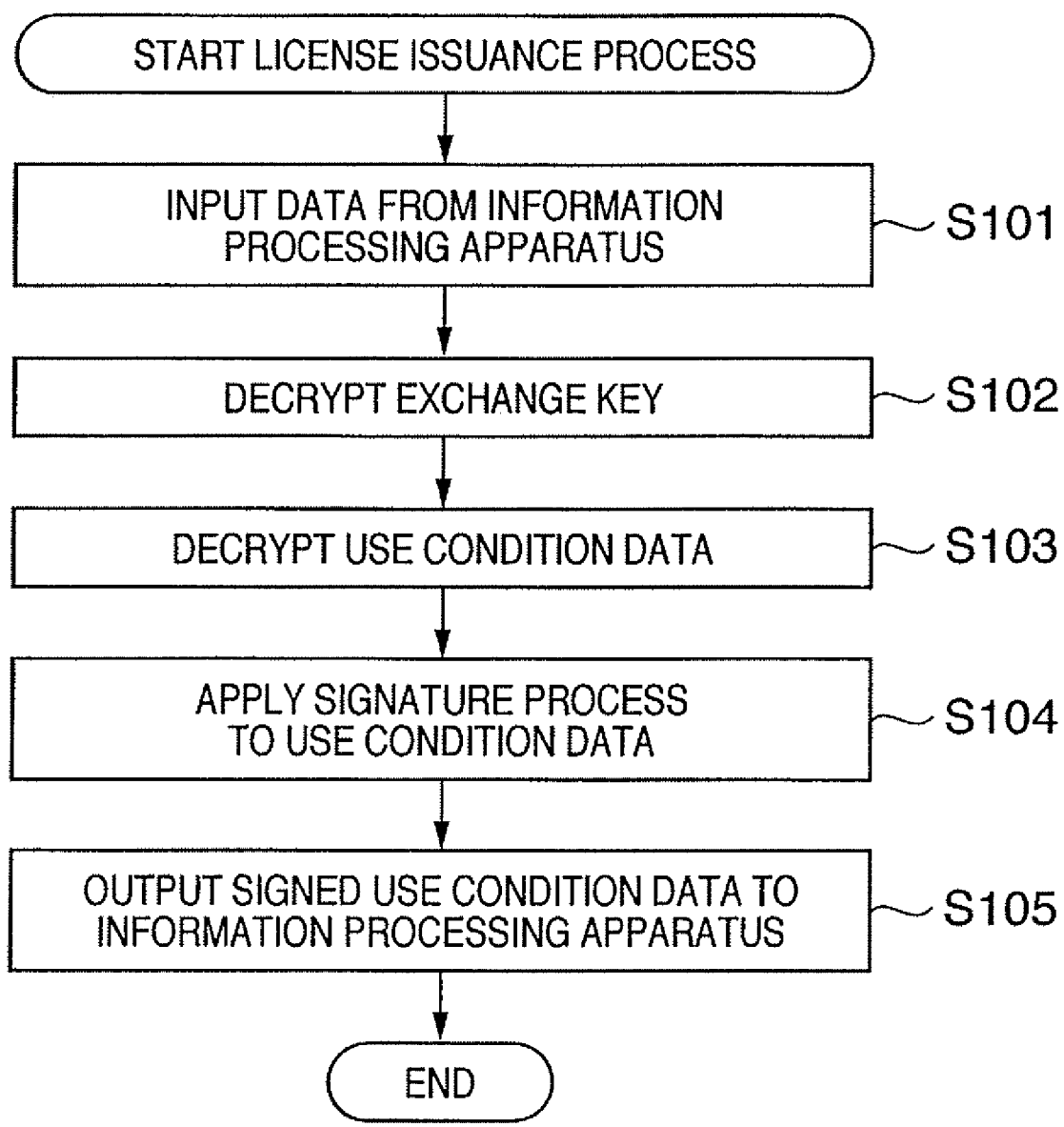
FIG. 10 is a flowchart showing a license issuance processing to be executed by the license server.

FIG. 10 is a flowchart showing a license issuance process executed by the license server 13.

The input/output unit 91 receives the encrypted exchange key and encrypted use condition data from the information processing apparatus 12 (S101). The exchange key decryption unit 92 decrypts the received encrypted exchange key using the private key of the license sever 13 (S102).

The use condition decryption unit 93 decrypts the received encrypted use condition data using the decrypted exchange key (S103). The use condition signature unit 94 applies the signature process to the decrypted use condition data using the private key of the license server 13 (S104). The input/output unit 91 outputs the signed use condition data to the information processing apparatus 12 (S105).

As described above, the first embodiment executes the DRM protection process using the image processing apparatus 11, information processing apparatus 12, and license server 13. Therefore, the encryption process of image data is executed only once in the image processing apparatus 11, and the entire system can efficiently execute the DRM protection process. The image data, image key, exchange key, and use condition data exchanged between the image processing apparatus 11 and information processing apparatus 12 or between the information processing apparatus 12 and license server 13 are encrypted. Therefore, wiretap or alternation of these data by an ill-intentioned third party can be prevented. In the first embodiment, the information processing apparatus 12 receives the exchange key used upon encrypting the image key in the image processing apparatus 11 from the image processing apparatus 11, and encrypts the use condition data using this exchange key. For this reason, the information processing apparatus 12 can encrypt the image key used to encrypt image data, and use condition data for the image data using the same exchange key, and need only encrypt the exchange key only once.

First Modification of Embodiment

The above embodiment has exemplified a case wherein after image data generated by the image processing apparatus 11 is transferred to the information processing apparatus 12, the information processing apparatus 12 inputs (generates) the use condition. However, the information processing apparatus 12 may input (generate) the use condition in advance, and can transfer that use condition data to the image processing apparatus 11. In this case, upon generating image data by the image processing apparatus 11, the image processing apparatus 11 can set the use condition data transferred in advance from the information processing apparatus 12 to the image data. A modification in which the image processing apparatus 11 sets the use condition input (generated) in advance by the information processing apparatus 12 to image data will be described below.

[First Modification of Image Processing Apparatus]

Figure 11:
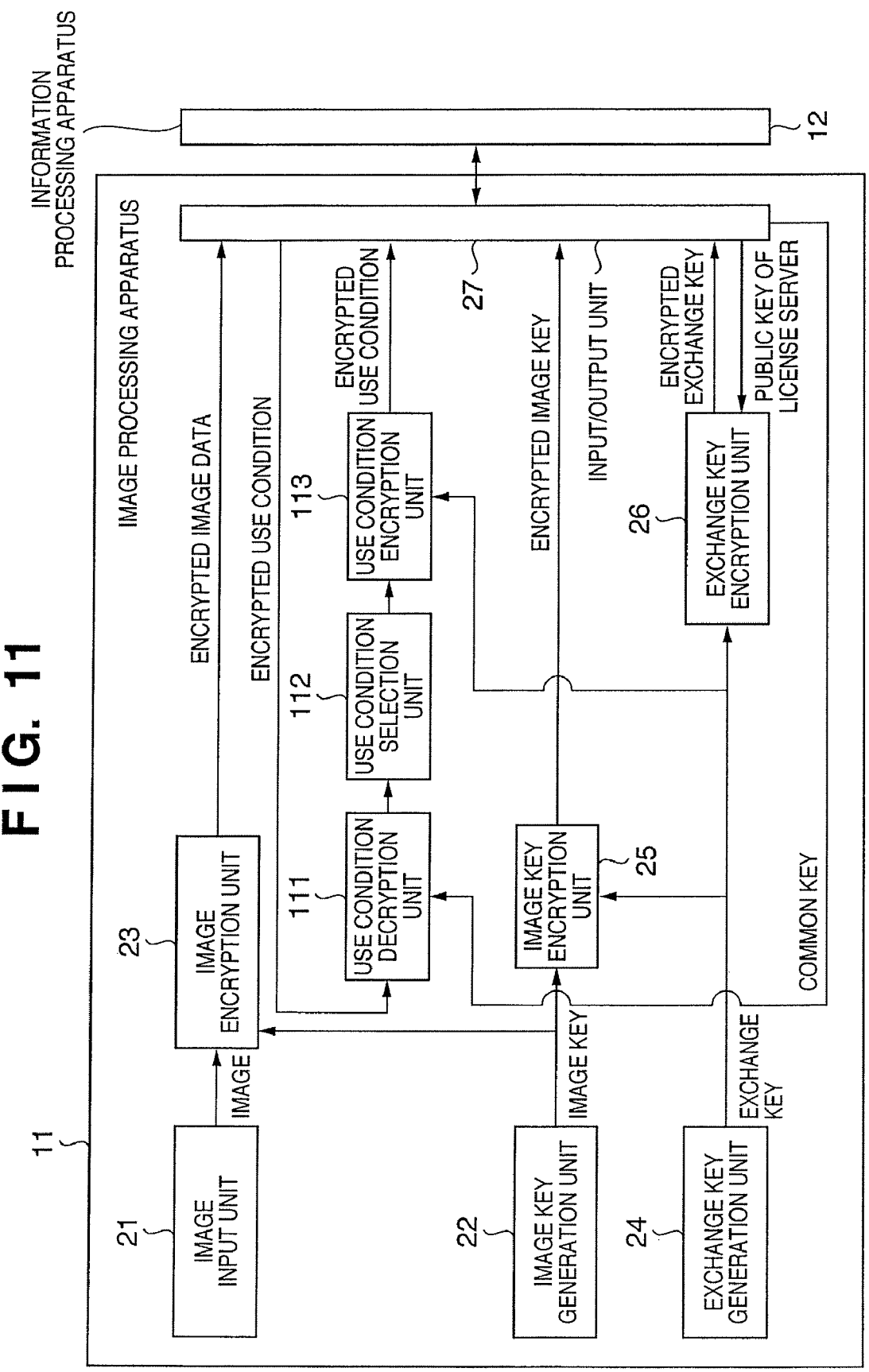
FIG. 11 is a block diagram showing the arrangement of an image processing apparatus according to the first modification.

FIG. 11 is a block diagram showing the arrangement of the image processing apparatus 11 according to the first modification. Unlike in the arrangement shown in FIG. 2, the input/output unit 27 receives encrypted use condition data from the information processing apparatus 12. Especially, assume that the image processing apparatus 11 shown in FIG. 11 is an apparatus which does not have any interface used to directly input (generate) a use condition, but has an interface used to set the use condition set by an external apparatus. Also, the image processing apparatus 11 shown in FIG. 11 does not have any communication means that directly communicates with the license server.

A use condition decryption unit 111 decrypts the encrypted use condition data using a common key common to the image processing apparatus 11 and information processing apparatus 12, and stores the decrypted use condition data in a memory (not shown).

In the first modification, a plurality of use condition data are input from the information processing apparatus 12, and are stored in the memory. A use condition selection unit 112 allows the use to select desired use condition data in synchronism with generation of image data using an interface (not shown)

A use condition encryption unit 113 encrypts the selected use condition data using the exchange key generated by the exchange key generation unit 24, and outputs the encrypted use condition data to the information processing apparatus 12 via the input/output unit 27.

Note that the common key is securely shared between the image processing apparatus 11 and information processing apparatus 12 in advance.

In the first embodiment, a plurality of use conditions are input from the information processing apparatus 12, and the use condition selection unit 112 allows the user to select desired use condition data to be applied to the generated image data. However, the present invention is not limited to this. For example, only one use condition data may be input from the information processing apparatus 12, and may be applied to all generated image data. In this case, the use condition selection unit 112 does not execute any special process.

Decryption of Use Condition

The use condition decryption unit 111 executes the following process.

$$C=Dc(K_C, EC) \quad (10)$$

where C is the decrypted use condition data,

Dc(x, y) is the decryption process for decrypting cipher text y using key data x, $K_c$ is the common key, and EC is the encrypted use condition data.

The decryption process Dc executed by the use condition decryption unit 111 corresponds to an encryption process Ec executed by a use condition encryption unit 121 to be described later.

Encryption of Use Condition

The use condition encryption unit 113 executes the following process.

$$EC=Ec(K_{EX}, C) \quad (11)$$

where EC is the encrypted use condition data,

Ec(x, y) is the encryption process for encrypting plain text y using key data x, $K_{EX}$ is the exchange key data, and C is the use condition data.

[First Modification of Information Processing Apparatus]

Figure 12:
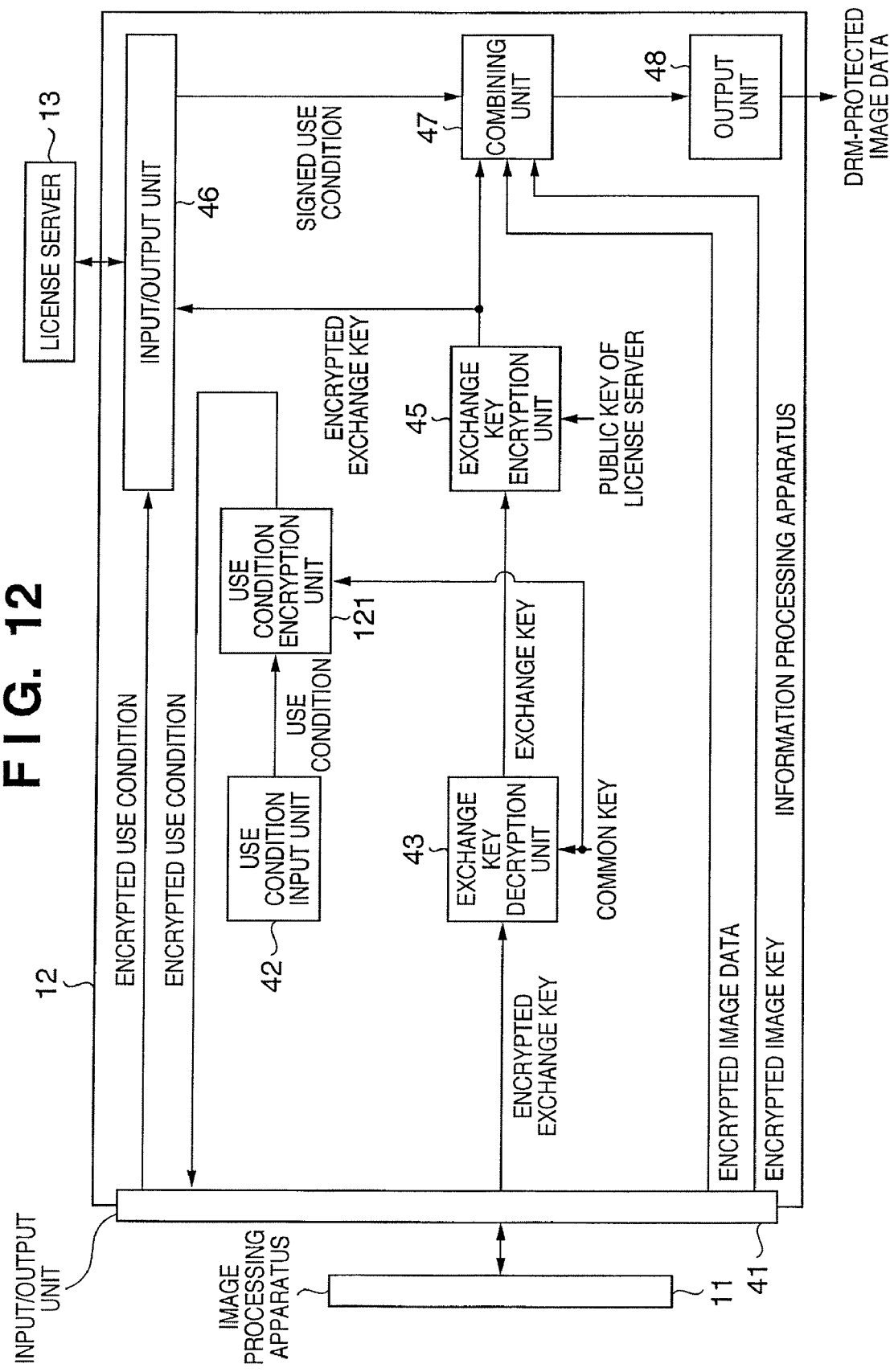
FIG. 12 is a block diagram showing the arrangement of an information processing apparatus according to the first modification.

FIG. 12 is a block diagram showing the arrangement of the information processing apparatus 12 of the first modification. Unlike in the arrangement shown in FIG. 4, the input/output unit 41 inputs and outputs the encrypted use condition data.

The use condition input unit 42 inputs the use condition of image data using an input interface in advance (not shown). A use condition encryption unit 121 encrypts the use condition data output from the use condition input unit 42 using a common key. The input/output unit 41 outputs the use condition data encrypted using the common key to the image processing apparatus 11. The input/output unit 46 outputs the use condition data which is input from the image processing apparatus 11 and is encrypted using the exchange key to the license server 13 together with the exchange key encrypted using the public key of the license server 13.

Encryption of Use Condition

The use condition encryption unit 121 executes the following process.

$$EC=Ec(K_C, C) \quad (12)$$

where EC is the encrypted use condition data,

Ec(x, y) is the encryption process for encrypting plain text y using key data x, $K_c$ is the common key data, and C is the use condition data output from the use condition input unit 42.

The first modification is not particularly limited to the encryption process, and can use various common key-based encryption algorithms such as AES, DES, and the like. The processes of the use condition input unit 42 and use condition encryption unit 121 in the information processing apparatus 12 are executed in advance before the process of the image input unit 21 of the image processing apparatus 11, and the encrypted use condition data is held in the memory of the image processing apparatus 11. Upon execution of the process of the image input unit 21, the encrypted use condition data held in the memory is read out to execute the processes of the use condition decryption unit 111 and subsequent units.

With this arrangement, the information processing apparatus 12 can input (generate) and set the use condition in place of the image processing apparatus 11. For example, when it is difficult for the user to operate a use interface used to set the use condition of the image processing apparatus 11, the information processing apparatus 12 can set the use condition, thus improving user's convenience. Furthermore, since the use condition can be set before generation of image data, the use condition of image data to be generated can be set in advance, and the image data can be surely protected.

Note that the above embodiment and modification encrypt the use condition data using an exchange key, and output the encrypted use condition data to the license server 13. However, the present invention is not limited to such specific process, and the use condition data may be encrypted using an image key. When the use condition data is encrypted using an image key, and the image key is encrypted using a public key of the license server 13 in place of encrypting an exchange key using the public key of the license server 13, the need for an exchange key can be obviated.

The above embodiment and modification have exemplified a case wherein the use condition data is encrypted using an exchange key upon outputting the use condition data from the image processing apparatus 11 or information processing apparatus 12 to the license server 13. However, the present invention is not limited to such specific process, and the use condition data may be signed using a private key of the image processing apparatus 11 or information processing apparatus 12 in addition to encryption. Since the use condition data is signed in addition to encryption, the license server authenticates the user of the client which generated the use condition data, and issues an issued license to only the user who has been successfully authenticated. Furthermore, the license server 13 checks according to a predetermined security policy whether or not that user has an issuance authority of the license described in the use condition data, after the user authentication. If it is determined that a license can be issued, the license server 13 may issue the issued license.

Second Modification of Embodiment

In the first embodiment and first modification, the use condition is input in the information processing apparatus 12. However, the present invention is not limited to this, and the use condition may be input (generated) in the image processing apparatus 11. The second modification will exemplify a case wherein the use condition is input (generated) in the image processing apparatus 11.

[Second Modification of Image Processing Apparatus]

Figure 13:
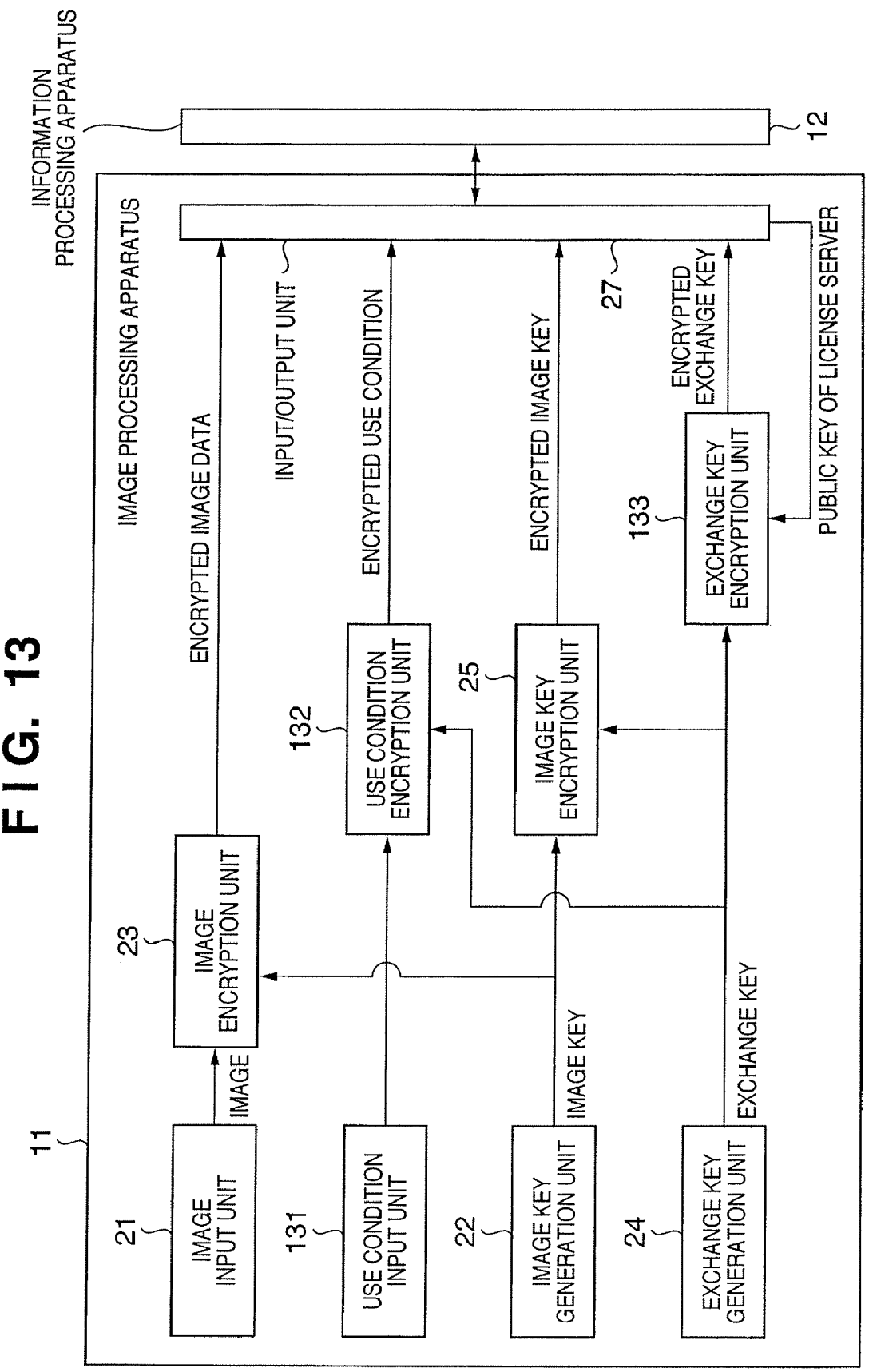
FIG. 13 is a block diagram showing the arrangement of an image processing apparatus according to the second modification.

FIG. 13 is a block diagram for explaining the arrangement of the image processing apparatus 11 of the second modification. Note that respective processors will be described as hardware components in the following description for the sake of convenience, but functions corresponding to the respective processors may be implemented by computer programs. Especially, assume that the image processing apparatus 11 shown in FIG. 13 is an apparatus which has an interface used to input (generate) the use condition, and does not have any communication means that directly communicates with the license server 13.

A use condition input unit 131 inputs a use condition of image data to be generated by the image input unit 21 using an input interface (not shown).

Encryption of Use Condition

A use condition encryption unit 132 executes the following process.

$$EC = Ec(K_{EX}, C) \quad (13)$$

where EC is the encrypted use condition data,

Ec(x, y) is the encryption process for encrypting plain text y using key data x, $K_{EX}$ is the exchange key data, and C is the use condition data.

Encryption of Exchange Key

An exchange key encryption unit 133 executes the following process.

$$EK_{EX} = Ep(KL_{PUB}, K_{EX}) \quad (14)$$

where $EK_{EX}$ is the encrypted exchange key data,

Ep(x, y) is the encryption process for encrypting plain text y using key data x, $KL_{PUB}$ is the public key data of the license server 13, and $K_{EX}$ is the exchange key data.

Note that the second modification is not particularly limited to the encryption process, and can adopt various public key-based encryption algorithms such as RSA and the like.

First Process

Figure 14:
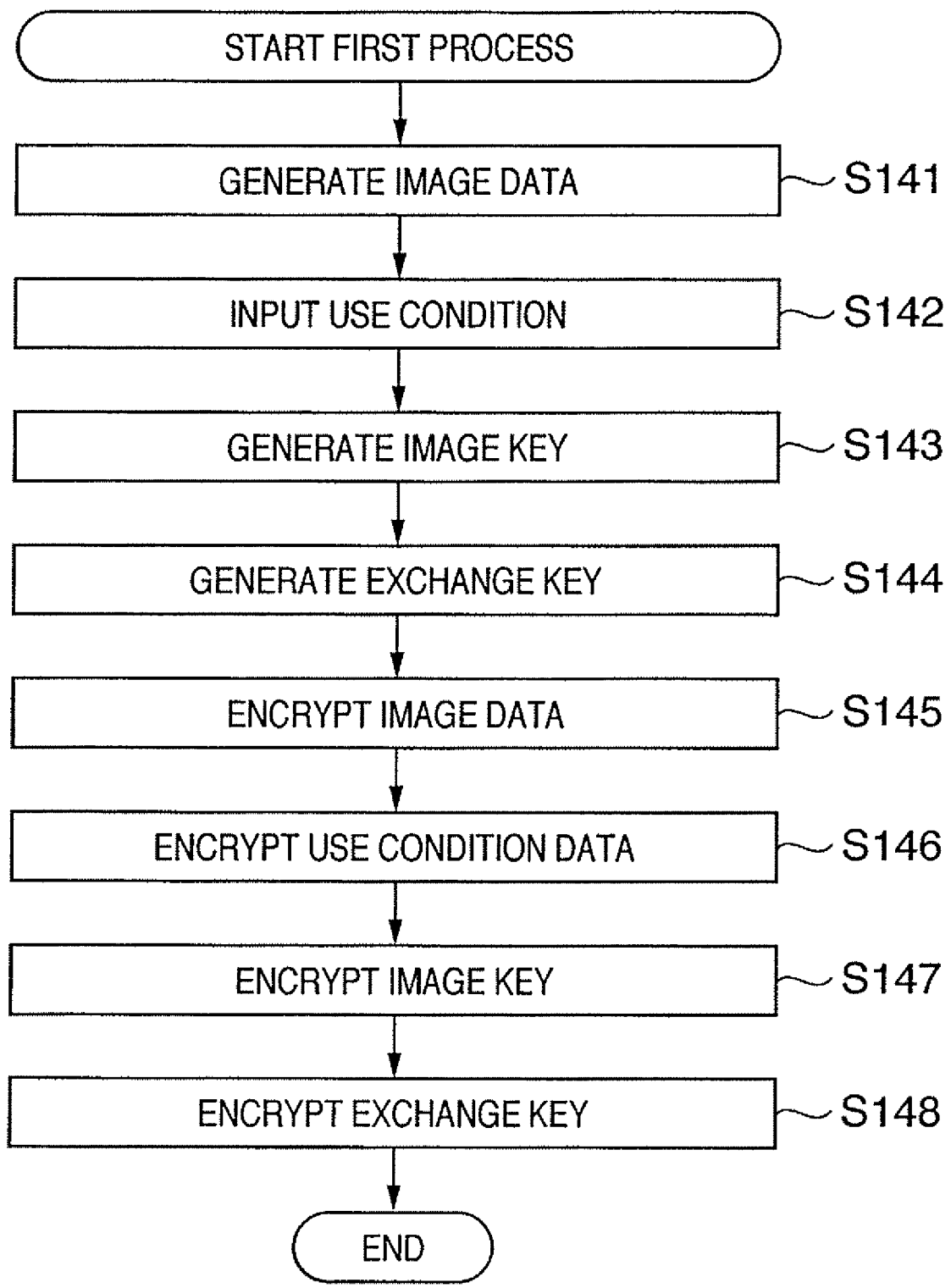
FIG. 14 is a flowchart showing the procedure of a first process to be executed by the image processing apparatus according to the second modification.

FIG. 14 is a flowchart showing the procedure of the first process to be executed by the image processing apparatus 11 of the second modification.

The image input unit 21 generates image data (S141), and the use condition input unit 131 inputs the use condition of the generated image data (S142). The image key generation unit 22 and exchange key generation unit 24 respectively generate an image key and exchange key (S143, S144).

The image encryption unit 23 encrypts the image data using the image key (S145). The use condition encryption unit 132 encrypts the use condition data using the exchange key (S146). Furthermore, the image key encryption unit 25 encrypts the image key using the exchange key (S147).

The exchange key encryption unit 133 encrypts the exchange key using the public key of the license server 13 (S148).

[Second Modification of Information Processing Apparatus]

Figure 15:
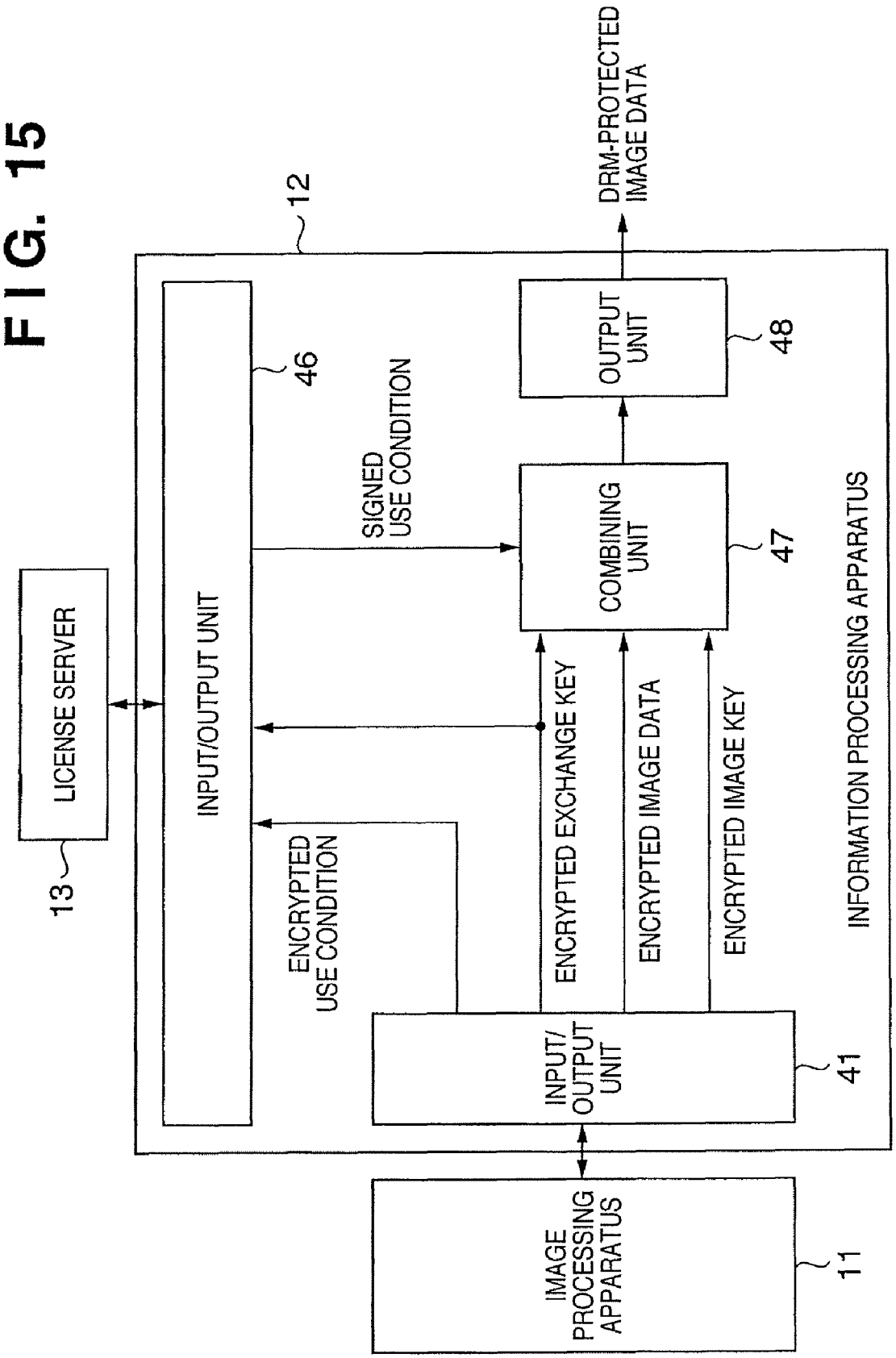
FIG. 15 is a block diagram showing the arrangement of an information processing apparatus according to the second modification.

FIG. 15 is a block diagram showing the arrangement of the information processing apparatus 12 of the second modification. Note that respective processors will be described as hardware components in the following description for the sake of convenience, but functions corresponding to the respective processors may be implemented by computer programs.

As shown in FIG. 15, the information processing apparatus 12 of the second modification receives the encrypted use condition data, encrypted exchange key, encrypted image data, and encrypted image key from the image processing apparatus 11 via the input/output unit 41. The information processing apparatus 12 outputs the encrypted use condition data and encrypted exchange key of the received data to the license server 13 via the input/output unit 46.

Subsequently, the information processing apparatus 12 receives the signed use condition data from the license server 13 via the input/output unit 46, and the combining unit 47 combines the signed use condition data to the encrypted exchange key, encrypted image data, and encrypted image key. The output unit 48 outputs the combined data as DRM-protected image data.

Second Process

Figure 16:
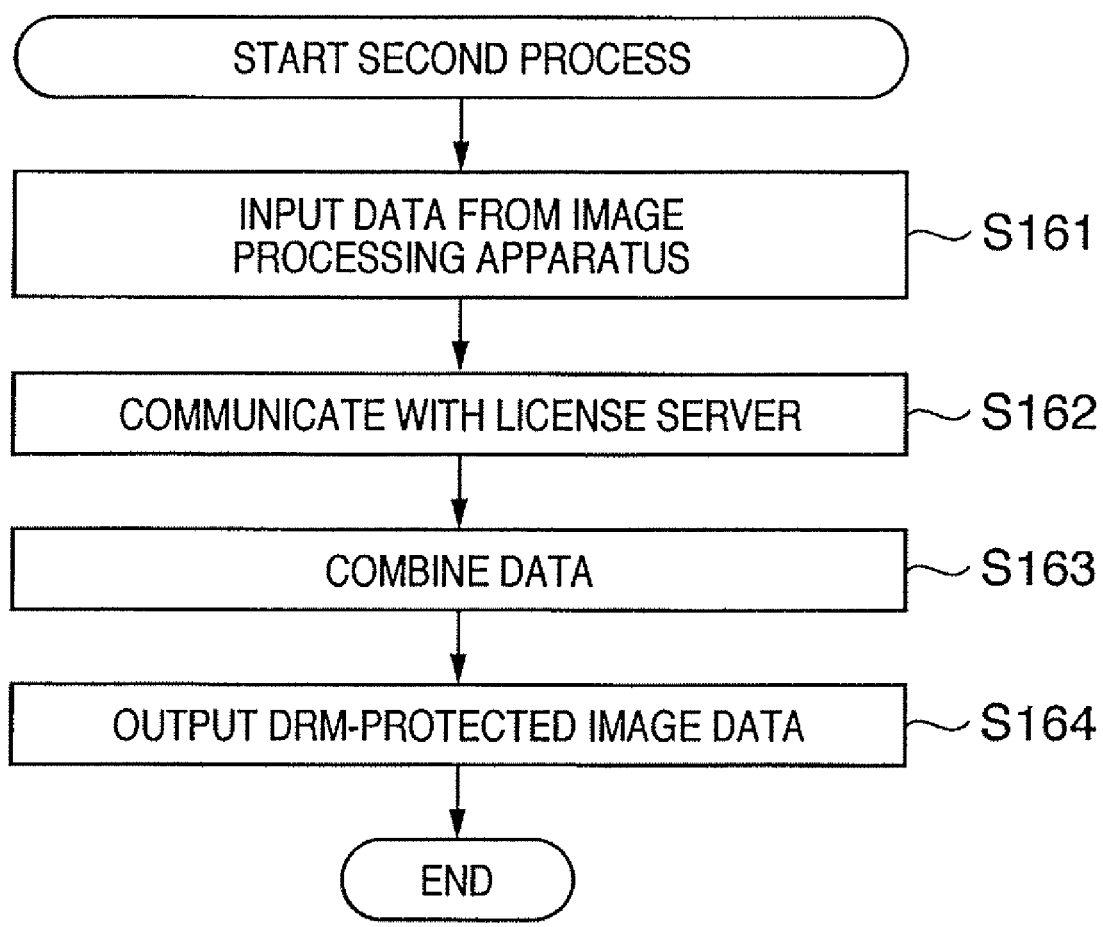
FIG. 16 is a flowchart showing the procedure of a second process to be executed by the information processing apparatus according to the second modification.

FIG. 16 is a flowchart showing the procedure of the second process to be executed by the information processing apparatus 12 of the second modification.

The input/output unit 41 receives the encrypted image data, encrypted use condition data, encrypted image key, and encrypted exchange key from the image processing apparatus 11 (S161). The input/output unit 46 then communicates with the license sever 13 to output the encrypted use condition data and encrypted exchange key to the license server 13, and receives the signed use condition data from the license server 13 (S162).

The combining unit 47 combines, to the signed use condition data input in step S162, the encrypted exchange key, encrypted image key, and encrypted image data input in step S161 (S163). The output unit 48 outputs the combined data as DRM-protected image data (S164).

Note that the internal arrangement and process of the license server 13 are the same as those of the first embodiment, and a description thereof will be omitted.

According to the aforementioned second modification, since the use condition can be set for the image data generated inside the image processing apparatus 11, the DRM protection process can be executed for the generated image data more reliably.

Third Modification of Embodiment

In the above embodiment and modifications, if the image key is altered or forged after the DRM-protected image data shown in FIG. 7 is output, such alteration or forgery is hardly detected. The third modification which can detect alteration or forgery of DRM-protected image data will be described below.

In the third modification, since the arrangement and process of the image processing apparatus 11 are the same as those in the aforementioned embodiment and modifications, a description thereof will be omitted, and the information processing apparatus 12 and license server 13 which have different arrangements and processes will be explained.

[Third Modification of Information Processing Apparatus]

The arrangement of the information processing apparatus 12 according to the third modification will be described first using FIG. 20.

Figure 20:
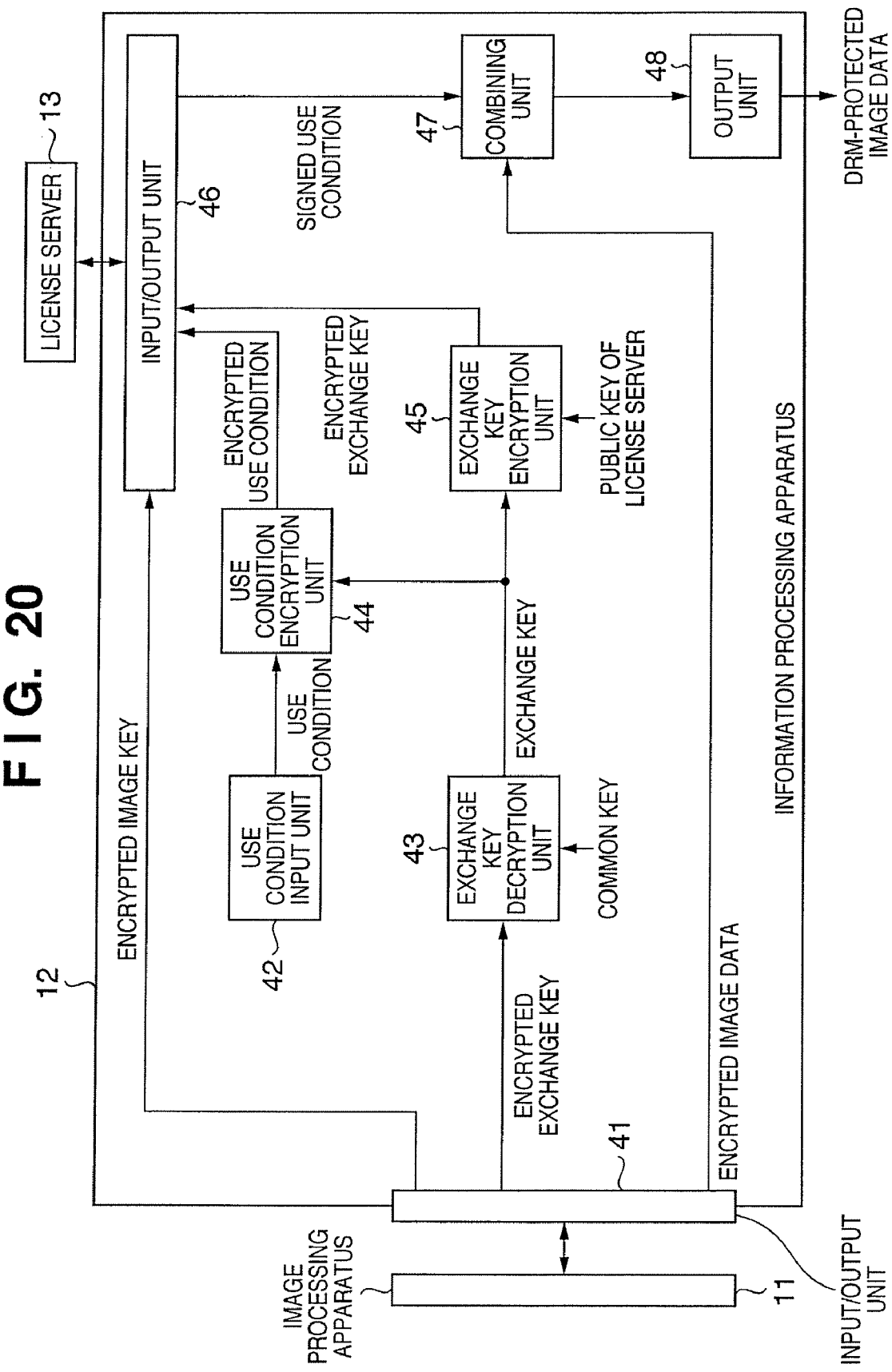
FIG. 20 is a block diagram showing the arrangement of an information processing apparatus according to the third modification.

FIG. 20 is a block diagram showing the arrangement of the information processing apparatus 12 of the third modification. Note that respective processors will be described as hardware components in the following description for the sake of convenience, but functions corresponding to the respective processors may be implemented by computer programs.

Unlike in FIG. 4, in the third modification, as shown in FIG. 20, the encrypted image key received by the input/output unit 41 is input to the input/output unit 46 in place of the combining unit 47. Furthermore, the signed use condition data includes the image key encrypted by the public key of the license server 13 (although not shown). Also, the encrypted exchange key output from the exchange key encryption unit 45 is not output to the combining unit 47, and is output to only the input/output unit 46.

The second process to be executed by the information processing apparatus 12 will be described below. The second process to be executed by the information processing apparatus 12 has the same procedure as in FIG. 8. However, in step S86 the encrypted image key input in step S81 is output to the license server 13 in addition to the encrypted use condition data and encrypted exchange key. The signed use condition data input from the license server 13 includes the image key (to be described in detail later) encrypted using the public key of the license server 13. Furthermore, in step S87 the combining unit 47 combines the encrypted image data input by the input/output unit 41 and the signed use condition data input by the input/output unit 46 to obtain DRM-protected image data, as shown in FIG. 21.

[Third Modification of License Server]

The arrangement of the license server 13 of the third modification will be described below using FIG. 22.

Figure 22:
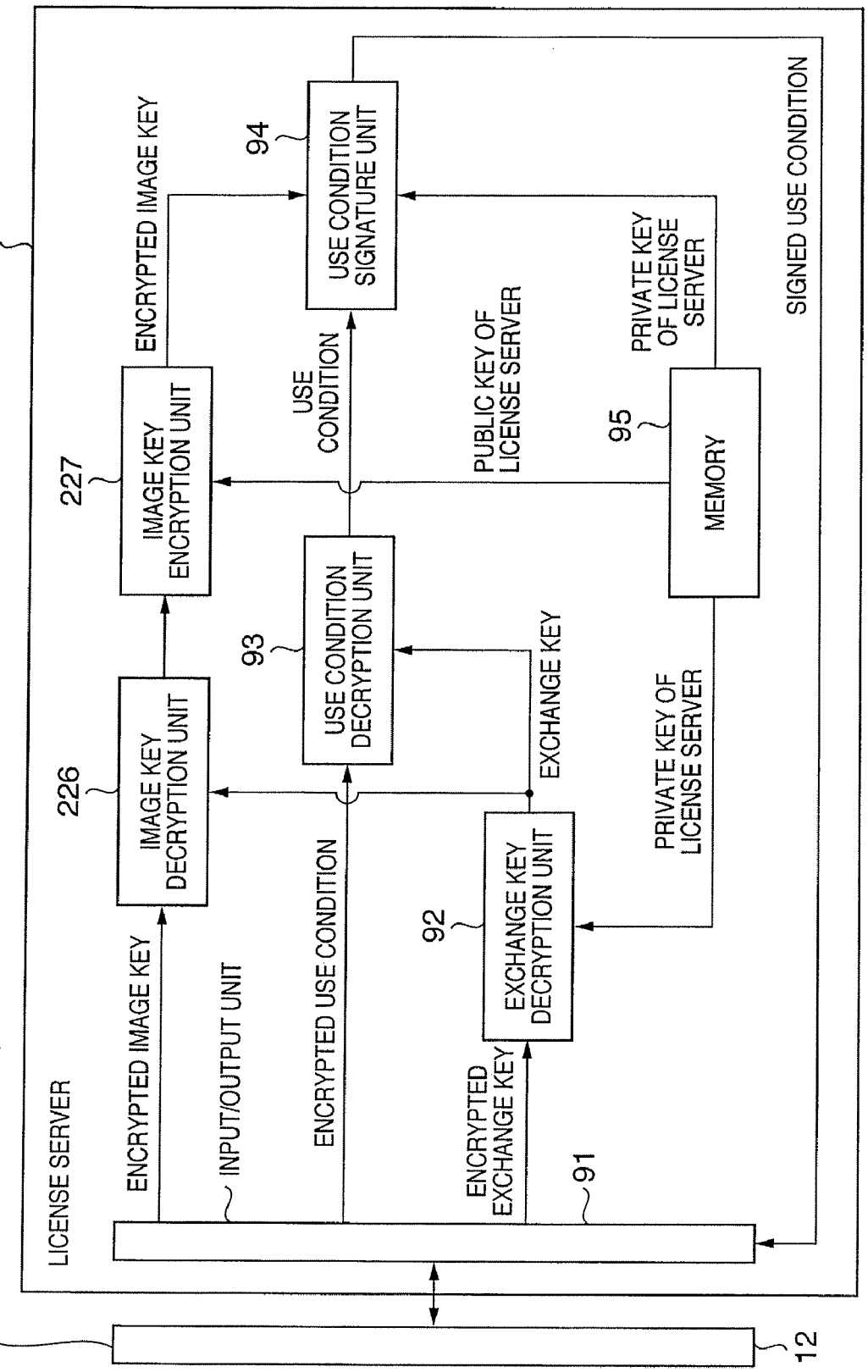
FIG. 22 is a block diagram showing the arrangement of a license server according to the third modification.

FIG. 22 is a block diagram showing the arrangement of the license server 13 of the third modification. Note that respective processors will be described as hardware components in the following description for the sake of convenience, but functions corresponding to the respective processors may be implemented by computer programs.

Unlike in FIG. 9, in the third modification, as shown in FIG. 22, an image key decryption unit 226 and image key encryption unit 227 are added. The input/output unit 91 receives the encrypted image key in addition to the encrypted exchange key and encrypted use condition data, and outputs the received encrypted image key to the image key decryption unit 226. The image key decryption unit 226 and image key encryption unit 227 will be described below.

Decryption of Image Key

The image key decryption unit 226 executes the following process.

$$K_{IMG}=Dc(K_{EX},EK_{IMG}) \quad (15)$$

where $K_{IMG}$ is the image key data, $EK_{IMG}$ is the encrypted image key data, $Dc(x, y)$ is the decryption process of decrypting cipher text y using key data x, and $K_{EX}$ is the exchange key data.

The decryption process Dc executed by the image key decryption unit 226 corresponds to the encryption process Ec executed by the image key encryption unit 25 shown in FIG. 2.

Encryption of Image Key

The image key encryption unit 227 encrypts the image key decrypted by the image key decryption unit 226 using the public key of the license server 13. The image key encryption unit 227 executes the following process.

$$EK_{IMG}=Ep(KL_{PUB},K_{IMG}) \quad (16)$$

where $EK_{IMG}$ is the encrypted image key data, $Ep(x, y)$ is the encryption process for encrypting plain text y using key data x, $KL_{PUB}$ is the public key data of the license server, and $K_{IMG}$ is the decrypted image key data.

Signature Process

The use condition signature unit 94 in the third modification executes the following process.

$$SIGN=S(KL_{PRI},(C,EK_{IMG})) \quad (17)$$

where SIGN is the signed use condition data, $S(x, y)$ is the signature process for signing data y to be signed using key data x, $KL_{PRI}$ is the private key data, C is the decrypted use condition data, and $EK_{IMG}$ is the encrypted image key data.

That is, unlike in the above embodiment, the third modification executes the signature process for not only the use condition data but also the image key data encrypted in the previous stage. Note that the signed use condition data in the third modification includes the encrypted image key.

Note that the third modification applies the signature process to the use condition data and encrypted image key data together. However, the present invention is not limited to this, and may independently apply the signature process to the use condition data and encrypted image key data. In this case, the use condition signature unit 94 outputs two data, i.e., the signed use condition data and signed encrypted image key data. The combining unit 47 combines these two data and the encrypted image data to output the DRM-protected image data, needless to say.

Issued License

The license issuance process to be executed by the license server 13 of the third modification will be described below using FIG. 23.

Figure 23:
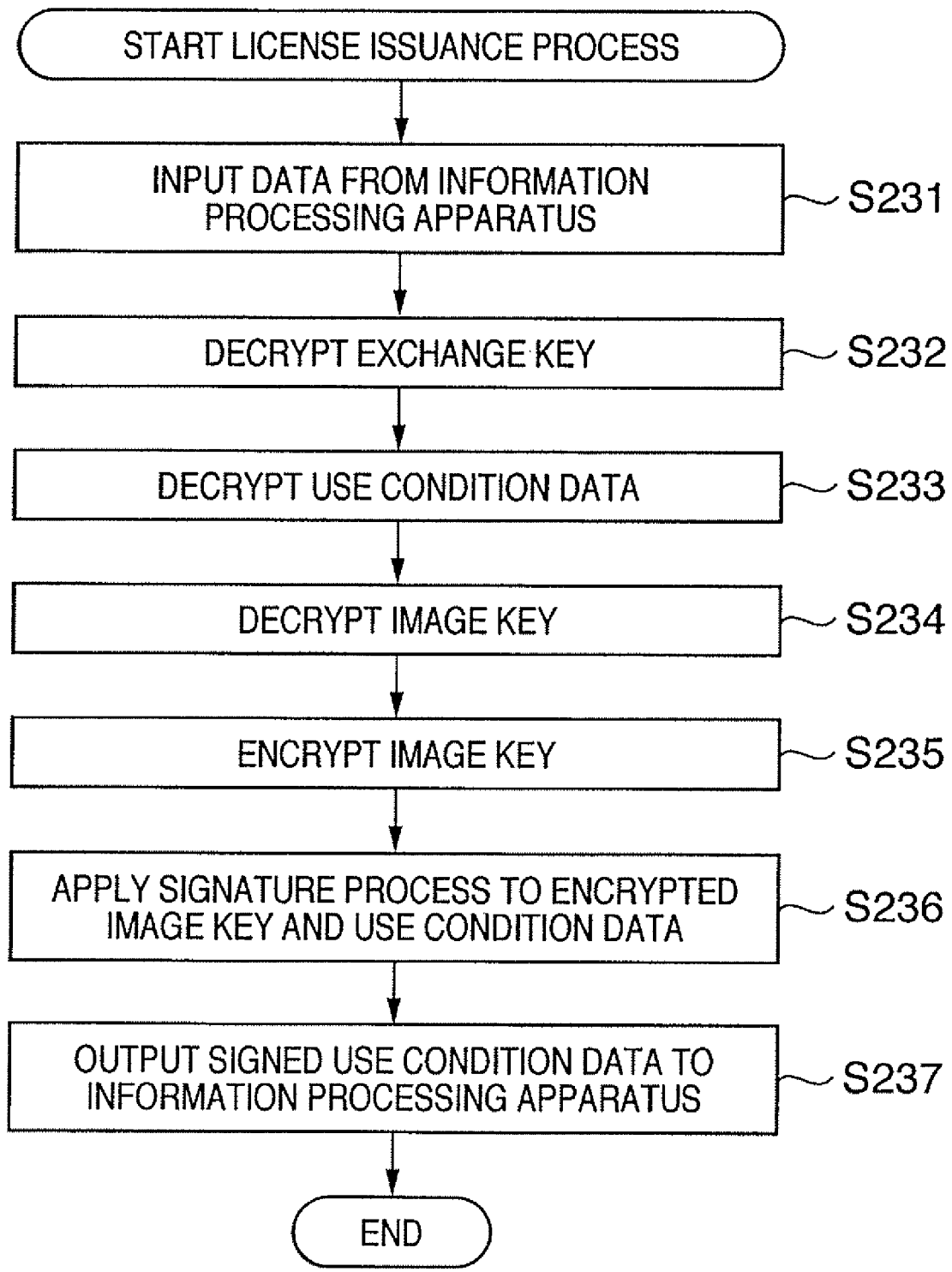
FIG. 23 is a flowchart showing a license issuance processing to be executed by the license server according to the third modification.

FIG. 23 is a flowchart showing the license issuance process to be executed by the license server 13 of the third modification.

The input/output unit 91 receives the encrypted exchange key and encrypted use condition data from the information processing apparatus 12 (S231). The exchange key decryption unit 92 decrypts the received encrypted exchange key using the private key of the license sever 13 (S232).

The use condition decryption unit 93 decrypts the received encrypted use condition data using the decrypted exchange key (S233). On the other hand, the image key decryption unit 226 decrypts the received encrypted image key using the decrypted exchange key (S234). The image key encryption unit 227 encrypts the image key decrypted in the previous stage again using the public key of the license server 13 (S235).

After that, the use condition signature unit 94 applies the signature process to the decrypted use condition data and the encrypted image key using the private key of the license server 13 (S236). The input/output unit 91 outputs the signed use condition data (including the encrypted image key) to the information processing apparatus 12 (S237).

With this arrangement, when the DRM-protected image data which is finally output from the information processing apparatus 12 has been altered or forged, such alteration or forgery can be detected.

According to the first embodiment including the first to third modifications described above, upon applying the DRM protection process to the image data generated by the image processing apparatus 11, the image data need not undergo encryption twice. That is, the image processing apparatus 11 encrypts the image data, but the information processing apparatus 12 does not encrypt it. Therefore, an efficient DRM protection process, which can prevent wiretap and alteration of the image data, can be implemented.

Second Embodiment

The information process according to the second embodiment of the present invention will be described in detail hereinafter with reference to the accompanying drawings. Note that the same reference numerals in the second embodiment denote the same parts as in the first embodiment, and a detailed description thereof will be omitted.

The first embodiment allows the user to set the use condition using the information processing apparatus 12 after generation of image data, to set the use condition using the information processing apparatus 12 before generation of image data, or to set the use condition using the information processing apparatus 12 substantially simultaneously with generation of image data. In other words, the first embodiment can execute only a desired process of the DRM protection process as the first process, and can execute the remaining process as the second process using another apparatus.

Image data, which has undergone any of various types of first processes as a part of the DRM protection process, then undergoes the appropriate second process as the remaining process of the DRM protection process, thus finally completing the DRM protection process. The second embodiment will exemplify a case wherein it is capable of performing the second process required to complete the DRM protection process even upon reception of image data which has undergone any of various types of first processes.

[First Process]

Figure 17:
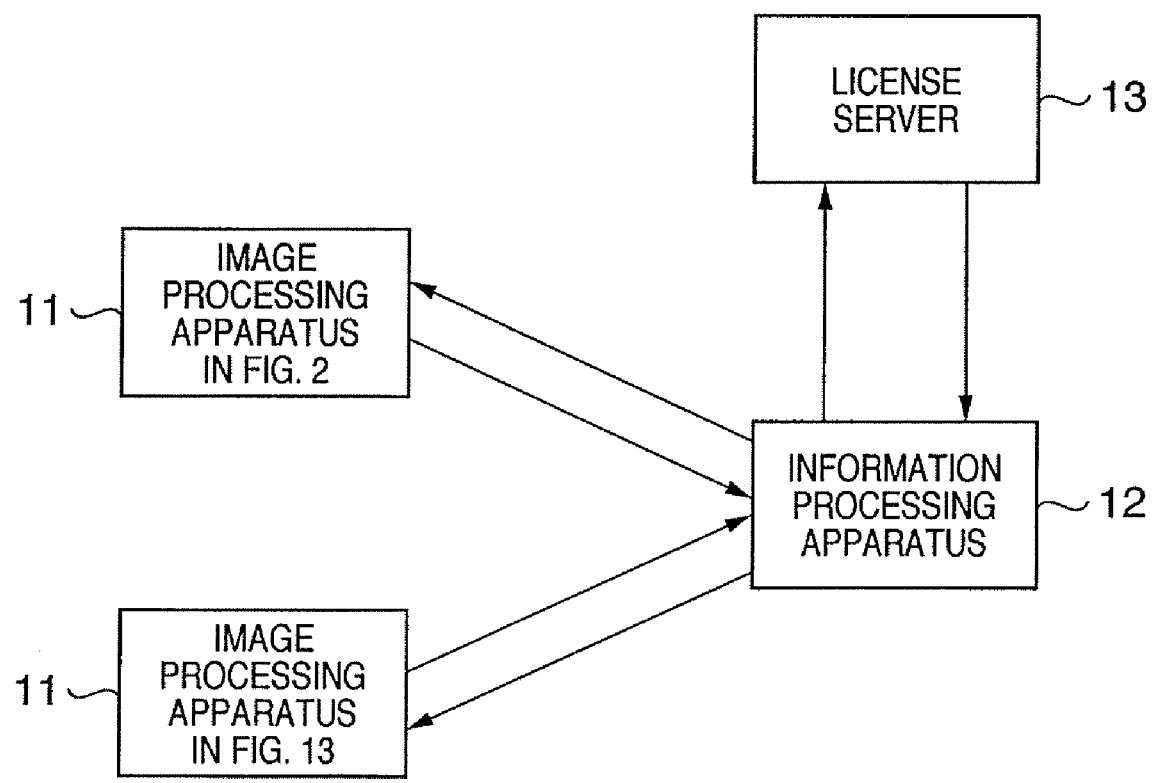
FIG. 17 is a diagram showing the arrangement of a system according to the second embodiment.

As the first process, various arrangements shown in FIGS. 2, 11, and 13 can be applied. The second process required to complete the DRM protection process of the image data which has undergone any of various types of first processes will be described below. In other words, as shown in FIG. 17, image data which has undergone the first process by the image processing apparatus 11 (FIG. 2) in the first embodiment or that which has undergone the first process by the image processing apparatus 11 (FIG. 13) in the third modification may be input. The second embodiment will explain the arrangement and process of the information processing apparatus 12, which are required to surely complete the DRM protection process even upon reception of either image data.

Assume that the image processing apparatus 11 in either FIG. 2 or 13 inputs image data which has undergone the first process, for the sake of simplicity. However, the present invention is not limited to this, and can be applied to image data which has undergone any of various types of first processes such as image data which has undergone the first process by the image processing apparatus 11 of the second modification shown in FIG. 11, and the like.

In the image processing apparatus 11 (FIGS. 2 and 13) of the second embodiment, the input/output unit 27 outputs control information in addition to the encrypted image data, encrypted image key, and encrypted exchange key (note that the encrypted use condition is output only in case of FIG. 13). Note that the control information indicates what kind of processing the image processing apparatus 11 executes as the first process. In the second embodiment, as an example of the control information, a code "0" is assigned to indicate that the image processing apparatus 11 does not set any use condition, and a code "1" is assigned to indicate that the image processing apparatus 11 sets the use condition. Note that the control information is not limited to the binary code, and a multi-valued code indicating various kinds of information can be applied.

[Information Processing Apparatus]

The arrangement of the information processing apparatus 12 of the second embodiment will be described below using FIG. 18.

Figure 18:
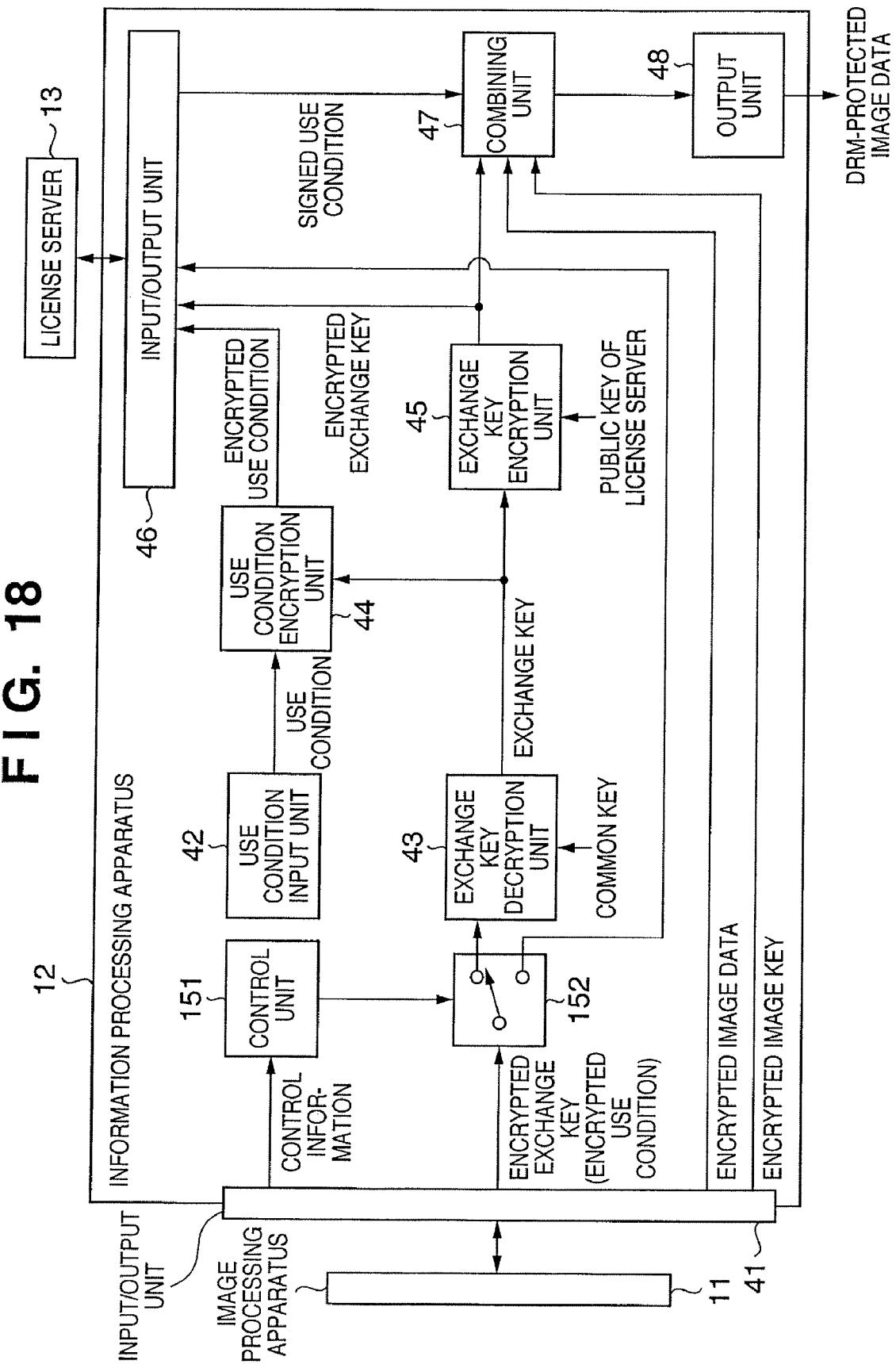
FIG. 18 is a block diagram showing the arrangement of an information processing apparatus according to the second embodiment.

FIG. 18 is a block diagram showing the arrangement of the information processing apparatus 12 according to the second embodiment. The information processing apparatus 12 shown in FIG. 18 has an arrangement which can complete the DRM protection process of image data which has undergone any of various types of first processes.

A control unit 151 receives the control information which is received by the input/output unit 41 from the image processing apparatus 11, and controls a switch unit 152 according to the control information. The control information indicates whether the image processing apparatus 11 executed the first process shown in FIG. 2 (code "0") or that shown in FIG. 13 (code "1"). The image processing apparatus 11 appends the control information to the encrypted image data and the like upon outputting them, as exemplified in FIG. 24. The control unit 151 controls the switch unit 152 in accordance with the control information to switch whether the encrypted exchange key information received from the image processing apparatus 11 is to be output to the exchange key decryption unit 43 or to the input/output unit 46. That is, when the control information indicates execution of the first process shown in FIG. 13 (i.e., "1"), the control unit 151 controls the switch unit 152 to output the encrypted exchange key to the input/output unit 46. On the other hand, when the control information indicates execution of the first process shown in FIG. 2 (i.e., "0"), the control unit 151 controls the switch unit 152 to output the encrypted exchange key to the exchange key decryption unit 43.

[Second Process]

Figure 19:
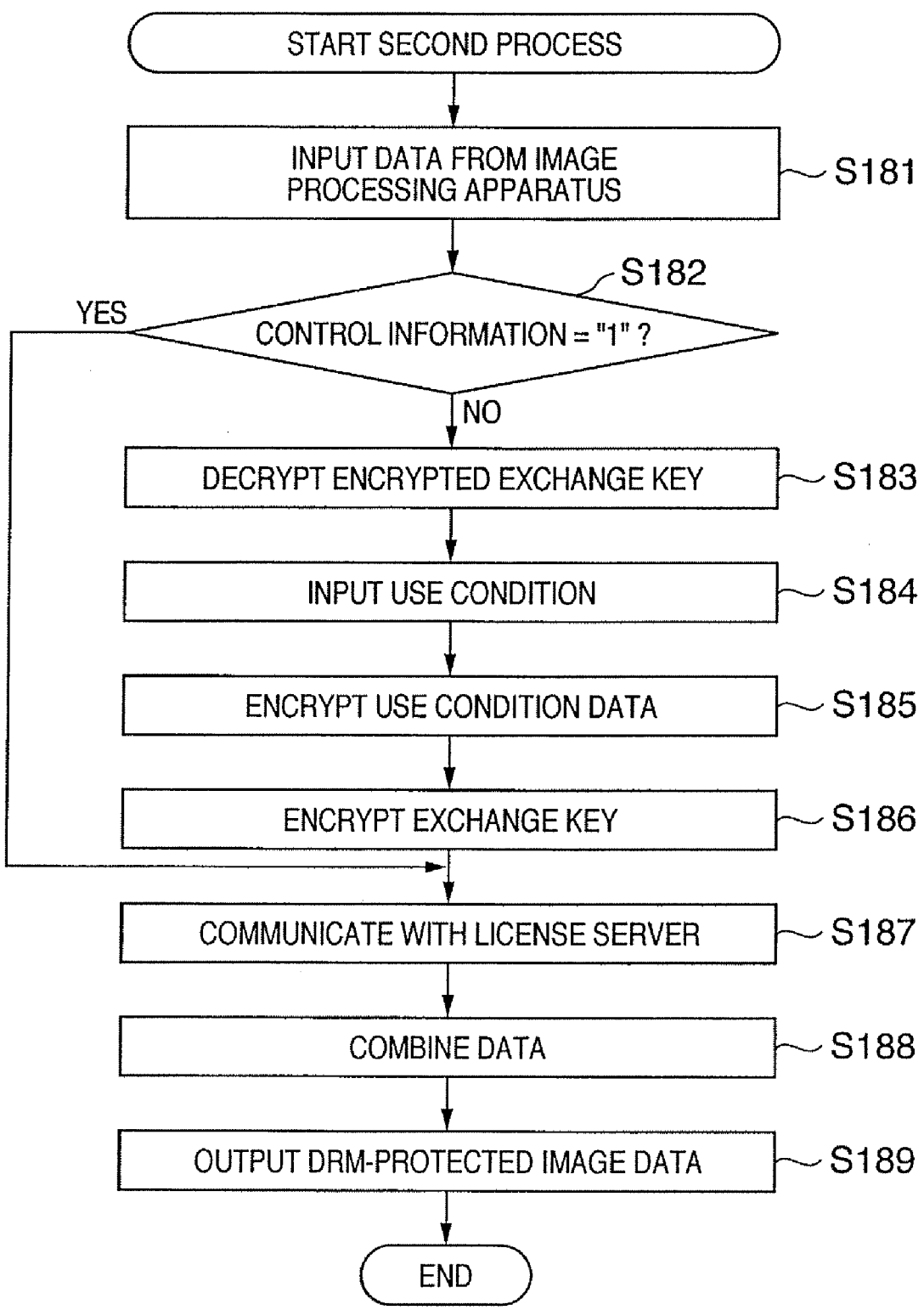
FIG. 19 is a flowchart showing the procedure of a second process to be executed by the information processing apparatus according to the second embodiment.

The procedure of the second process in the second embodiment will be described below using FIG. 19. FIG. 19 is a flowchart showing the procedure of the second process to be executed by the information processing apparatus 12.

The input/output unit 41 receives the encrypted image data, encrypted image key, encrypted exchange key, control information, and the like from the image processing apparatus 11 (S118).

The control unit 151 controls the switch unit 152 based on the control information (S182). That is, if the control information is "0" (if the image processing apparatus 11 shown in FIG. 2 executed the first process), the process advances to step S183. On the other hand, if the control information is "1" (if the image processing apparatus 11 shown in FIG. 13 executed the first process), the process jumps to step S187.

If the control information is "0", the exchange key decryption unit 43 decrypts the encrypted exchange key (S183). On the other hand, the use condition input unit 42 inputs the use condition of the image data (S184), and the use condition encryption unit 44 encrypts data of the use condition (S185). After that, the exchange key encryption unit 45 encrypts the exchange key (S186).

The input/output unit 46 communicates with the license sever 13 to output the encrypted use condition data and encrypted exchange key to the license server 13, and receives the signed use condition data from the license server 13 (S187). In this case, if the control information is "0", the input/output unit 46 outputs the use condition data encrypted by the use condition encryption unit 44 to the license server 13. On the other hand, if the control information is "1", the input/output unit 46 outputs the encrypted use condition data received from the image processing apparatus 11 to the license server 13.

The combining unit 47 combines, with the signed use condition data input in step S187, the encrypted image data and encrypted image key input in step S181, and the encrypted exchange key encrypted in step S186 (S188). The output unit 48 outputs the combined data as DRM-protected image data (S189).

With the above arrangement, even upon reception of image data which has undergone any of various types of first processes, the information processing apparatus 12 can switch the second process based on the control information, and can appropriately complete the DRM protection process.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-380172, filed Dec. 28, 2005 and 2006-341948, filed Dec. 19, 2006, which are hereby incorporated by reference herein in their entirety.

What is claimed is:

1. An information processing apparatus comprising:
an input section, configured to input (a) encrypted image data which has undergone a part of a digital rights management (DRM) protection process, (b) an encrypted image key used in an encryption of the encrypted image data, (c) control information which indicates whether or not a use condition of the encrypted data is set in an image processing apparatus, and (d) an exchange key, from the image processing apparatus, wherein if the use condition is set, the exchange key is encrypted using a public key of a license server and said input section further inputs (e) use condition data which indicates the use condition is encrypted using the exchange key, and if the use condition is not set, the exchange key is encrypted using a common key securely shared between the information processing apparatus and the image processing apparatus;
a determiner, configured to determine, using the control information, whether the use condition is set or not;
a decryption section, configure to decrypt the exchange key using the common key if said determiner determines that the use condition is not set;
a setting section, configured to set use condition data of the encrypted image data;
a first encryption section, configured to encrypt the use condition data set by said setting section using the decrypted exchange key;
a second encryption section, configured to encrypt the decrypted exchange key using the public key of the license server so that the license server can decrypt the encrypted exchange key using a private key of the license server;
a transmitter, configured to transmit the use condition data encrypted by said first encryption section and the exchange key encrypted by said second encryption section to the license server if said determiner determines that the use condition is not set, and to transmit the encrypted use condition data and the encrypted exchange key input by said input section to the license server if said determine determines that the use condition is set;
a receiver configured to receive signed use condition data from the license server in response to the transmission of the encrypted use condition data,
a combiner, configured to combine the signed use condition data received by said receiver and the encrypted image data and the encrypted image key input by said input section to generate image data to be output; and
an output section, configured to output the image data which has undergone all parts of the DRM protection process.

2. An information processing method comprising:
using a processor to perform the steps of:
inputting (a) encrypted image data which has undergone a part of a digital rights management (DRM) protection process, (b) an encrypted image key used in an encryption of the encrypted image data, (c) control information which indicates whether or not a use condition of the encrypted image data is set in an image processing apparatus, and (d) an exchange key, from the image processing apparatus, wherein if the use condition is set, the exchange key is encrypted using a public key of a license server and (e) use condition data, which indicates the use condition and is encrypted using the exchange key, is further input in the inputting step, and if the use condition is not set, the exchange key is encrypted using a common key securely shared between the information processing apparatus and image processing apparatus;
determining, using the control information, whether or not the use condition is set;
in a first case, where it is determined that the use condition is not set, decrypting the exchange key using the common key, setting
use condition data of the encrypted image data, encrypting in a first encrypting step the use condition data set in the setting step using the decrypted exchange key, encrypting in a second encrypting step the decrypted exchange key using the public key of the license server so that the license server can decrypt the encrypted exchange key using a private key of the license server, and transmitting the use condition data encrypted in the first encrypting step and the exchange key encrypted in the second encrypting step to the license server,
in a second case, where it is determined that the use condition is set, transmitting the encrypted use condition data and the encrypted exchange key input in the inputting step to the license server, receiving signed use condition data from the license server in response to the transmission of the encrypted use condition data, combining the signed use condition data received in the receiving step, and the encrypted image data and the encrypted image key input in the inputting step to generate image data to be output; and outputting the image data which has undergone all parts of the DRM protection process.

3. A computer-executable program product stored in a non-transitory computer readable medium for causing a computer to perform an information processing method, the method comprising the steps of:

inputting (a) encrypted image data which has undergone a part of a digital rights management (DRM) protection process, (b) an encrypted image key used in an encryption of the encrypted image data, (c) control information which indicates whether or not a use condition of the encrypted image data is set in an image processing apparatus, and (d) an exchange key, from the image processing apparatus, wherein if the use condition is set, the exchange key is encrypted using a public key of a license server and (e) use condition data, which indicates the use condition and is encrypted using the exchange key, is further input in the inputting step, and if the use condition is not set, the exchange key is encrypted using a common key securely shared between the information processing apparatus and the image processing apparatus;

determining, using the control information, whether or not the use condition is set;

in a first case, where it is determined that the use condition is not set, decrypting the exchange key using the common key in advance, setting use condition data of the encrypted image data, encrypting in a first encrypting step the use condition data set in the setting step using the decrypted exchange key, encrypting in a second encrypting step the decrypted exchange key using the public key of the license server so that the license server can decrypt the encrypted exchange key using a private key of the license server, and transmitting the use condition data encrypted in the first encrypting step and the exchange key encrypted in the second encrypting step to the license server;

in a second case, where it is determined that the use condition is set, transmitting the encrypted use condition data and the encrypted exchange key input in the inputting step to the license server, receiving signed use condition data from the license server in response to the transmission of the encrypted use condition data, combining the signed use condition data received in the receiving step, and the encrypted image data and the encrypted image key input in the inputting step to generate image data to be output; and outputting the image data which has undergone all parts of the DRM protection process.

4. A non-transitory computer readable medium storing a computer-executable program for causing a computer to perform an information processing method, the method comprising the steps of:

inputting (a) encrypted image data which has undergone a part of a digital rights management (DRM) protection process, (b) an encrypted image key used in an encryption of the encrypted image data, (c) control information which indicates whether or not a use condition of the encrypted image data is set in an image processing apparatus, and (d) an exchange key, from the image processing apparatus, wherein if the use condition is set, the exchange key is encrypted using a public key of a license server and (e) use condition data, which indicates the use condition and is encrypted using the exchange key, is further input in the inputting step, and if the use condition is not set, the exchange key is encrypted using a common key securely shared between the information processing apparatus and the image processing apparatus;

determining, using the control information, whether or not the use condition of the encrypted image data is set;

in a first case, where it is determined that the use condition is not set, decrypting the exchange key using the common key, setting use condition data of the encrypted image data, encrypting in a first encrypting step the use condition data set in the setting step, encrypting in a second encrypting step the decrypted exchange key using the public key of the license server so that the license server can decrypt the encrypted exchange key using a private key of the license server, and transmitting the use condition data encrypted in the first encrypting step and the exchange key encrypted in the second encrypting step to the license server;

in a second case, where it is determined that the use condition is set, transmitting the encrypted use condition data and the encrypted exchange key input in the inputting step to the license server, receiving signed use condition data from the license server in response to the transmission of the encrypted use condition data, combining the signed use condition data received in the first receiving step, and the encrypted image data and the encrypted image key input in the inputting step to generate image data to be output; and outputting the image data which has undergone all parts of the DRM protection process.

* * * * *